(12) United States Patent
Eklöf et al.

(10) Patent No.: US 12,375,370 B2
(45) Date of Patent: Jul. 29, 2025

(54) QUALITY-OF-EXPERIENCE (QOE) MEASUREMENTS IT INTER-RADIO ACCESS TECHNOLOGY (IRAT) HANDOVER

(71) Applicant: Telefonaktiebolaget LM Ericsson (publ), Stockholm (SE)

(72) Inventors: Cecilia Eklöf, Täby (SE); Mattias Bergström, Sollentuna (SE); Robert Petersen, Linköping (SE); Gunnar Heikkilä, Gammelstad (SE); Filip Barac, Huddinge (SE); Angelo Centonza, Granada (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 325 days.

(21) Appl. No.: 17/921,548

(22) PCT Filed: Mar. 2, 2021

(86) PCT No.: PCT/SE2021/050174
§ 371 (c)(1),
(2) Date: Oct. 26, 2022

(87) PCT Pub. No.: WO2021/242156
PCT Pub. Date: Dec. 2, 2021

(65) Prior Publication Data
US 2023/0116324 A1   Apr. 13, 2023

Related U.S. Application Data

(60) Provisional application No. 63/029,847, filed on May 26, 2020.

(51) Int. Cl.
*H04L 41/5067* (2022.01)
*H04W 36/00* (2009.01)
*H04W 36/14* (2009.01)

(52) U.S. Cl.
CPC ..... *H04L 41/5067* (2013.01); *H04W 36/0058* (2018.08); *H04W 36/1443* (2023.05)

(58) Field of Classification Search
CPC . H04L 41/5067; H04L 41/0806; H04L 43/06; H04W 36/0058; H04W 36/1443; H04W 24/10
See application file for complete search history.

(56) References Cited

U.S. PATENT DOCUMENTS

2014/0307707 A1*  10/2014  Mestanov ......... H04W 36/0066
                                                 370/331
2019/0313359 A1*  10/2019  Lee ....................... H04W 76/14

FOREIGN PATENT DOCUMENTS

EP           3583804 A1     12/2019
WO    WO-2019030737 A1 *    2/2019  .......... H04L 5/0055
WO        2019106055 A1     6/2019

OTHER PUBLICATIONS

3GPP TS 28.405 V1.3.0 (Apr. 2020) (Year: 2020).*

(Continued)

*Primary Examiner* — Mohammad S Anwar
(74) *Attorney, Agent, or Firm* — Weisberg I.P. Law, P.A.

(57) ABSTRACT

Embodiments include methods for a first radio network node (RNN) in a wireless network to configure quality of experience (QoE) measurements by user equipment (UEs). Such methods include receiving, from a measurement function in the wireless network, a QoE measurement configuration (QMC) associated with one or more service types; and configuring one or more UEs with the QMC. Such methods also include sending to a second RNN in the wireless network, a first request for handover of a particular one of the UEs from a first cell served by the first RNN via a first radio access technology (RAT) to a second cell served by the second RNN via a second RAT. The first request includes the QMC. Other embodiments include complementary methods (Continued)

performed by a second RNN or by a UE, as well as first RNNs, second RNNs, and UEs configured to perform such methods.

16 Claims, 16 Drawing Sheets

(56) References Cited

OTHER PUBLICATIONS

"3GPP TS 23.501 V15.9.0", 3rd Generation Partnership Project; Technical Specification Group Services and System Aspects; System architecture for the 5G System (5GS); Stage 2 (Release 15), Mar. 2020, pp. 1-248.
"3GPP TS 26.247 V16.2.0", 3rd Generation Partnership Project; Technical Specification Group Services and System Aspects; Transparent end-to-end Packet-switched Streaming Service (PSS); Progressive Download and Dynamic Adaptive Streaming over http (3GP-DASH) (Release 16), Dec. 2019, pp. 1-139.
"3GPP TS 27.007 V15.5.0", 3rd Generation Partnership Project; Technical Specification Group Core Network and Terminals; AT command set for User Equipment (UE) (Release 15), Mar. 2019, pp. 1-390.
"3GPP TS 28.405 V1.3.0", S5-202345; 3rd Generation Partnership Project; Technical Specification Group Services and System Aspects; Telecommunication management; Quality of Experience (QoE) measurement collection; Control and configuration (Release 16), Apr. 2020, pp. 1-53.
"3GPP TS 36.323 V16.0.0", 3rd Generation Partnership Project; Technical Specification Group Radio Access Network; Evolved Universal Terrestrial Radio Access (E-UTRA); Packet Data Convergence Protocol (PDCP) specification (Release 16), Mar. 2020, pp. 1-56.
"3GPP TS 36.331 V16.0.0", 3rd Generation Partnership Project; Technical Specification Group Radio Access Network; Evolved Universal Terrestrial Radio Access (E-UTRA); Radio Resource Control (RRC); Protocol specification (Release 16), Mar. 2020, pp. 1-1048.
"3GPP TS 36.413 V15.8.0", 3rd Generation Partnership Project; Technical Specification Group Radio Access Network; Evolved Universal Terrestrial Radio Access Network (E-Utran); S1 Application Protocol (S1AP) (Release 15), Dec. 2019, pp. 1-389.
"3GPP TS 38.424 V15.2.0", 3rd Generation Partnership Project; Technical Specification Group Radio Access Network; NG-RAN; Xn data transport (Release 15), Jul. 2019, pp. 1-8.
"3GPP TS 38.331 V16.0.0", 3rd Generation Partnership Project; Technical Specification Group Radio Access Network; NR; Radio Resource Control (RRC) protocol specification (Release 16), Mar. 2020, pp. 1-835.
"Discussion on incoming LS for QoE measurement collection in Lte", 3GPP TSG RAN WG2 #107bis, R2-1912638, Chongqing, China, Oct. 14-18, 2019, pp. 1-6.
"QoE Measurement Collection Rel-16", 3GPP TSG-RAN WG3 #108-e, R3-203870, Online, Jun. 1-11, 2020, pp. 1-7.
"Summary on [99#39][LTE/QMC] RAN controlled CP based solution", 3GPP TSG-RAN WG2 #99bis, R2-1710708, Prague, Czech, Oct. 9-13, 2017, pp. 1-8.
"Updates for QoE measurement support (X2AP, S1AP, RANAP)", 3GPP TSG-RAN WG3 #108-e, R3-203320, Online, Jun. 1-12, 2020, pp. 1-6.
"3GPP TS 38.300 V15.5.0", 3rd Generation Partnership Project; Technical Specification Group Radio Access Network; NR; NR and NG-RAN Overall Description; Stage 2 (Release 15), Mar. 2019, pp. 1-97.
"3GPP TS 38.300 V16.1.0", 3rd Generation Partnership Project; Technical Specification Group Radio Access Network; NR; NR and NG-RAN Overall Description; Stage 2 (Release 16), Mar. 2020, pp. 1-133.
"3GPP TS 38.413 V15.5.0", 3rd Generation Partnership Project; Technical Specification Group Radio Access Network; NG-RAN; NG Application Protocol (NGAP) (Release 15), Sep. 2019, pp. 1-329.
"3GPP TR 38.801 V2.0.0 (Mar. 2017)", 3rd Generation Partnership Project; Technical Specification Group Radio Access Network; Study on New Radio Access Technology; Radio Access Architecture and Interfaces (Release 14), Mar. 2017, pp. 1-90.
"3GPP TS 25.331 V11.4.0", 3rd Generation Partnership Project; Technical Specification Group Radio Access Network; Radio Resource Control (RRC); Protocol specification (Release 11), Dec. 2012, pp. 1-2056.

* cited by examiner

```
-- ASN1START
RRCConnectionReconfiguration ::=         SEQUENCE {
    rrc-TransactionIdentifier            RRC-TransactionIdentifier,
    criticalExtensions                   CHOICE {
        c1                               CHOICE{
            rrcConnectionReconfiguration-r8    RRCConnectionReconfiguration-r8-IEs,
            spare7 NULL, spare6 NULL, spare5 NULL, spare4 NULL, spare3 NULL, spare2 NULL, spare1 NULL
        },
        criticalExtensionsFuture         SEQUENCE {}
    }
}

RRCConnectionReconfiguration-r8-IEs ::= SEQUENCE {
    measConfig                           MeasConfig                                              OPTIONAL,  -- Need ON
    mobilityControlInfo                  MobilityControlInfo                                     OPTIONAL,  -- Cond HO
    dedicatedInfoNASList                 SEQUENCE (SIZE(1..maxDRB)) OF DedicatedInfoNAS          OPTIONAL,  -- Cond nonHO
    radioResourceConfigDedicated         RadioResourceConfigDedicated                            OPTIONAL,  -- Cond HO-toEUTRA
    securityConfigHO                     SecurityConfigHO                                        OPTIONAL,  -- Cond HO-toEPC
    nonCriticalExtension                 RRCConnectionReconfiguration-v890-IEs                   OPTIONAL
}

RRCConnectionReconfiguration-v890-IEs ::= SEQUENCE {
    lateNonCriticalExtension             OCTET STRING (CONTAINING RRCConnectionReconfiguration-v8m0-IEs) OPTIONAL,
    nonCriticalExtension                 RRCConnectionReconfiguration-v920-IEs                   OPTIONAL
}

-- Regular non-critical extensions:
RRCConnectionReconfiguration-v920-IEs ::= SEQUENCE {
    otherConfig-r9                       OtherConfig-r9                                          OPTIONAL,  -- Need ON
    fullConfig-r9                        ENUMERATED {true}                                       OPTIONAL,  -- Cond HO-Reestab
    nonCriticalExtension                 RRCConnectionReconfiguration-v1020-IEs                  OPTIONAL
}

-- ASN1STOP
```

FIG. 8

```
-- ASN1START
OtherConfig-r9 ::= SEQUENCE {
    ...,
    [[ measConfigAppLayer-r15     CHOICE{
        release                       NULL,
        setup                         SEQUENCE{
            measConfigAppLayerContainer-r15 OCTET STRING (SIZE(1..1000)),
            serviceType                     ENUMERATED {qoe, qoemtsi, spare6, spare5, spare4, spare3,
                                                        spare2, spare1}
        }
    }
    ailc-BitConfig-r15            BOOLEAN                                     OPTIONAL,    -- Need ON
    bt-NameListConfig-r15         BT-NameListConfig-r15                       OPTIONAL,    -- Need ON
    wlan-NameListConfig-r15       WLAN-NameListConfig-r15                     OPTIONAL,    -- Need ON
    ]],
    [[ withinAreaHandoverAppLayer-v15xy   WithinAreaHandoverAppLayer-v15xy    OPTIONAL     -- Need ON
    ]]
    ...
}
...
WithinAreaHandoverAppLayer-v15xy     ::= ENUMERATED {qoe, qoemtsi, spare6, spare5, spare4, spare3, spare2,
                                                     spare1}
WithinAreaHandoverAppLayerList-v15xy ::= SEQUENCE (SIZE (1..8)) OF WithinAreaHandoverAppLayer-v15xy
...
-- ASN1STOP
```

FIG. 9

```
-- ASN1START
otherConfig-r9 ::= SEQUENCE {
    ...,
    [[ measConfigAppLayer-r15         CHOICE{
        release                           NULL,
        setup                             SEQUENCE{
            measConfigAppLayerContainer-r15   OCTET STRING (SIZE(1..1000)),
            serviceType                       ENUMERATED {qoe, qoemtsi, spare6, spare5, spare4, spare3, spare2,
                                                          spare1}
        }
    }
    ailc-BitConfig-r15                BOOLEAN                                OPTIONAL,     -- Need ON
    bt-NameListConfig-r15             BT-NameListConfig-r15                  OPTIONAL,     -- Need ON
    wlan-NameListConfig-r15           WLAN-NameListConfig-r15                OPTIONAL,     -- Need ON
    ]],
    [[ withinAreaHandoverAppLayer-v15xy  WithinAreaHandoverAppLayer-v15xy   OPTIONAL     -- Need ON
    ]],
    ...,
    [[ continueMeasAppLayer-r17       ContinueMeasAppLayer-r17               OPTIONAL     -- Need ON
    ]]
}
...,
WithinAreaHandoverAppLayer-v15xy     ::= ENUMERATED {qoe, qoemtsi, spare6, spare5, spare4, spare3, spare2, spare1}
WithinAreaHandoverAppLayerList-v15xy ::= SEQUENCE (SIZE (1..8)) OF WithinAreaHandoverAppLayer-v15xy
ContinueMeasAppLayer-r17             ::= ENUMERATED {qoe, qoemtsi, spare6, spare5, spare4, spare3, spare2, spare1}
ContinueMeasAppLayerList-r17         ::= SEQUENCE (SIZE (1..8)) OF ContinueMeasAppLayer-r17
...
}
-- ASN1STOP
```

FIG. 10

```
<?xml version="1.0"?>
<xs:schema targetNamespace="urn:3GPP:ns:PSS:AdaptiveHTTPStreaming:2009:qm"
attributeFormDefault="unqualified"
elementFormDefault="qualified"
xmlns:xs="http://www.w3.org/2001/XMLSchema"
xmlns:xlink="http://www.w3.org/1999/xlink"
xmlns="urn:3GPP:ns:PSS:AdaptiveHTTPStreaming:2009:qm">
    <xs:annotation>
        <xs:appinfo>3GPP DASH Quality Reporting</xs:appinfo>
        <xs:documentation xml:lang="en">
            This Schema defines the quality reporting scheme information for 3GPP DASH.
        </xs:documentation>
    </xs:annotation>
    <xs:element name="ThreeGPQualityReporting" type="SimpleQualityReportingType"/>
    <xs:complexType name="SimpleQualityReportingType">
        <xs:sequence>
            <xs:element name="LocationFilter" type="LocationFilterType" minOccurs="0" maxOccurs="unbounded"/>
            <xs:any namespace="##other" processContents="lax" minOccurs="0" maxOccurs="unbounded"/>
        </xs:sequence>
        <xs:attribute name="apn" type="xs:string" use="optional"/>
        <xs:attribute name="format" type="FormatType" use="optional"/>
        <xs:attribute name="samplePercentage" type="xs:double" use="optional"/>
        <xs:attribute name="reportingServer" type="xs:anyURI" use="required"/>
        <xs:attribute name="reportingInterval" type="xs:unsignedInt" use="optional"/>
        <xs:any namespace="##other" processContents="lax" minOccurs="0" maxOccurs="unbounded"/>
    </xs:complexType>
    <xs:simpleType name="FormatType">
        <xs:restriction base="xs:string">
            <xs:enumeration value="uncompressed" />
            <xs:enumeration value="gzip" />
        </xs:restriction>
    </xs:simpleType>
    <xs:complexType name="LocationFilterType">
        <xs:sequence>
            <xs:element name="cellID" type="xs:unsignedLong" minOccurs="0" maxOccurs="unbounded"/>
            <xs:element name="shape" type="ShapeType" minOccurs="0"/>
            <xs:any namespace="##other" processContents="lax" minOccurs="0" maxOccurs="unbounded"/>
        </xs:sequence>
        <xs:anyAttribute namespace="##other" processContents="lax"/>
    </xs:complexType>
```

FIG. 12A (Schema continued from Fig. 12A)

```xml
<xs:complexType name="ShapeType">
  <xs:sequence>
    <xs:element name="PolygonList" type="PolygonListType" minOccurs="0"/>
    <xs:element name="CircularAreaList" type="CircularAreaListType" minOccurs="0"/>
    <xs:any namespace="##other" processContents="lax" minOccurs="0" maxOccurs="unbounded"/>
  </xs:sequence>
  <xs:anyAttribute namespace="##other" processContents="lax"/>
</xs:complexType>
<xs:complexType name="PolygonListType">
  <xs:annotation>
    <xs:documentation> see [OMA MLP] </xs:documentation>
  </xs:annotation>
  <xs:sequence>
    <xs:element name="Polygon" minOccurs="0" maxOccurs="unbounded"/>
    <xs:any namespace="##other" processContents="lax" minOccurs="0" maxOccurs="unbounded"/>
  </xs:sequence>
  <xs:attribute name="ConfLevel" type="xs:unsignedInt" use="optional"/>
  <xs:anyAttribute namespace="##other" processContents="lax"/>
</xs:complexType>
<xs:complexType name="CircularAreaListType">
  <xs:annotation>
    <xs:documentation> see [OMA MLP] </xs:documentation>
  </xs:annotation>
  <xs:sequence>
    <xs:element name="CircularArea" minOccurs="0" maxOccurs="unbounded"/>
    <xs:any namespace="##other" processContents="lax" minOccurs="0" maxOccurs="unbounded"/>
  </xs:sequence>
  <xs:attribute name="ConfLevel" type="xs:unsignedInt" use="optional"/>
  <xs:anyAttribute namespace="##other" processContents="lax"/>
</xs:complexType>
</xs:schema>
```

FIG. 12B

QUALITY-OF-EXPERIENCE (QOE) MEASUREMENTS IT INTER-RADIO ACCESS TECHNOLOGY (IRAT) HANDOVER

TECHNICAL FIELD

The present invention generally relates to wireless communication networks and particularly relates to measuring end-user experience in wireless networks, such as in relation to handover of an end-user device between different radio access technologies (RAT) in a wireless network.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. The present disclosure relates generally to NR, but the following description of Long-Term Evolution (LTE) technology is provided for context since it shares many features with NR.

LTE is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access procedure to move from RRC_IDLE to RRC_CONNECTED. In RRC_CON- NECTED, the UE's cell serving is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

Quality of Experience (QoE) measurements have been specified for UEs operating in LTE networks and in earlier-generation UMTS networks, with both operating under the same high-level principles. The purpose of QoE measurements is to measure the experience of end users when using certain applications over a network. For example, QoE measurements for streaming services and for MTSI (Mobility Telephony Service for IMS) are supported in LTE.

RRC signaling is used to configure application layer measurements in UEs and to collect QoE measurement result files from the configured UEs. For example, application layer measurement configuration from the core network (e.g., EPC) or a network operations/administration/maintenance (OAM) function can be encapsulated in a transparent container and sent to the serving eNB, which forwards it to a UE in an RRC message. Likewise, application layer measurements made by the UE can be encapsulated in a transparent container and sent to the serving eNB in an RRC message. The serving eNB can forward the container to a Trace Collector Entity (TCE) or a Measurement Collection Entity (MCE) associated with the EPC.

The fifth generation (5G) NR technology shares many similarities with fourth-generation LTE. For example, NR uses CP-OFDM (Cyclic Prefix Orthogonal Frequency Division Multiplexing) in the downlink (DL) and both CP-OFDM and DFT-spread OFDM (DFT-S-OFDM) in the uplink (UL). Also, for both LTE and NR, DL and UL physical resources are organized into equal-sized 1-ms subframes in the time domain. Each subframe is divided into multiple slots of equal duration, with each slot including multiple OFDM-based symbols. As another example, NR RRC layer includes RRC_IDLE and RRC_CONNECTED states of LTE as well as another state known as RRC_INACTIVE.

In early deployments, NR coverage may be limited to certain areas and may be supplemented in and around these areas by existing LTE and/or UMTS coverage. As such, there is expected to be a significant number of UE handovers between cells supporting NR and cells supporting LTE and/or UMTS but not NR. In general, these types of handovers are referred as inter-radio access technology (IRAT) handovers.

However, if a UE has initiated configured QoE measurements in an LTE cell but is later handed over to an NR cell, there is no mechanism for continuing the ongoing QoE measurements in NR. As such, these QoE measurements will be interrupted while the UE is in the NR cell. Similarly, if a UE has initiated configured QoE measurements in an NR cell but is later handed over to an LTE cell, there is no mechanism for continuing the ongoing QoE measurements in LTE, causing the QoE measurements to be interrupted while the UE is in the LTE cell. These interruptions can significantly reduce the utility and/or value of the QoE measurements.

SUMMARY

Embodiments of the present disclosure provide specific improvements to communication between user equipment (UE) and network nodes in a wireless network, such as by facilitating solutions to exemplary problems summarized above and described in more detail below.

Some embodiments include methods (e.g., procedures) for configuring quality of experience (QoE) measurements by user equipment (UEs). These exemplary methods can be performed by a first radio network node (RNN, e.g., base station, eNB, gNB, ng-eNB, etc., or components thereof) in a wireless network (e.g., E-UTRAN, NG-RAN).

These exemplary methods can include receiving, from a measurement function in the wireless network, a QoE measurement configuration (QMC) associated with one more service types. For example, the measurement function can be in a core network (e.g., EPC, 5GC) or part of an operations/administration/maintenance (OAM) function associated with the wireless network. These exemplary methods can also include configuring one or more UEs with the QMC. These exemplary methods can also include sending, to a second RNN in the wireless network, a first request for handover of a particular one of the UEs from a first cell served by the first RNN via a first radio access technology (RAT) to a second cell served by the second RNN via a second RAT (i.e., different than the first RAT). The first request for handover includes the QMC.

In some embodiments, the QMC includes identifiers of one or more service types associated with the first RAT and an area scope field that includes one or more identifiers associated with the first RAT. In some embodiments, the QMC also includes identifiers of one or more service types associated with the second RAT, and the area scope field also includes one or more identifiers associated with the second RAT. In such embodiments, the identifiers associated with the first RAT and the identifiers associated with the second RAT can include one or more of the following: cell identifiers, tracking area codes (TACs), tracking area identities (TAIs), and public land mobile network identities (PLMN IDs).

In some embodiments, these exemplary methods can also include, after sending the first request for handover, receiving from the particular UE a measurement report for QoE measurements via the first RAT based on the QMC. The measurement report can include an indication that the measurement report is unsolicited or event-based (e.g., in relation to a handover). In some embodiments, these exemplary methods can also include receiving, from the second RNN, a second request for handover of the particular UE from the second cell to the first cell. The second request also includes the QMC for the UE.

Other embodiments include additional methods (e.g., procedures) for configuring quality of experience (QoE) measurements by user equipment (UEs). These exemplary methods can be performed by a second radio network node (RNN, e.g., base station, eNB, gNB, ng-eNB, etc., or components thereof) in a wireless network (e.g., E-UTRAN, NG-RAN).

These exemplary methods can include receiving, from a first RNN in the wireless network, a first request for handover of a UE from a first cell served by the first RNN via a first RAT to a second cell served by the second RNN via a second RAT (i.e., different than the first RAT). The first request can include a QoE measurement configuration (QMC) for the UE. These exemplary methods can also include determining whether the UE can perform QoE measurements via the second RAT in accordance with the QMC. These exemplary methods can also include sending, to the UE, an indication of whether the UE can perform QoE measurements via the second RAT in accordance with the QMC.

In some embodiments, the QMC includes identifiers of one or more service types associated with the first RAT and an area scope field that includes one or more identifiers associated with the first RAT. In some embodiments, the QMC also includes identifiers of one or more service types associated with the second RAT, and the area scope field also includes one or more identifiers associated with the second RAT. In such embodiments, the identifiers associated with the first RAT and the identifiers associated with the second RAT can include one or more of the following: cell identifiers, tracking area codes (TACs), tracking area identities (TAIs), and public land mobile network identities (PLMN IDs).

In some embodiments, the determining operations can include one or more of the following: determining whether the QMC includes one or more service types associated with the second RAT; determining whether the QMC includes one or more service types associated with the first RAT that are also applicable in the second RAT; and determining whether the QMC includes one or more identifiers associated with the second RAT.

In some embodiments, the indication of whether the UE can perform QoE measurements via the second RAT can include a plurality of indications corresponding to QoE measurements for a respective plurality of service types.

In some embodiments, these exemplary methods can also include, after sending the UE an indication that the UE can perform QoE measurements via the second RAT in accordance with the QMC, receiving from the UE a measurement report for QoE measurements based on the QMC. In some of these embodiments, the measurement report can include an indication of a mapping between a first access bearer used for the QoE measurements in the first RAT and a second access bearer used for the QoE measurements in the second RAT.

In some embodiments, these exemplary methods can also include storing the QMC based on determining that the UE cannot perform QoE measurements via the second RAT in accordance with the QMC. In some of these embodiments, these exemplary methods can also include determining that the UE should be handed over to a third cell served by a third RNN via the first RAT; retrieving the stored QMC; and sending, to the third RNN, a second request for handover of the UE from the second cell to the third cell. The second request includes the QMC that was stored and retrieved.

Other embodiments include methods (e.g., procedures) for performing quality of experience (QoE) measurements configured by a wireless network. These exemplary methods can be performed by a user equipment (UE, e.g., wireless device, IoT device, modem, etc. or component thereof) in communication with first and second RNNs (e.g., base stations, eNBs, gNBs, ng-eNBs, etc., or components thereof) in the wireless network (e.g., E-UTRAN, NG-RAN).

These exemplary methods can include can receiving a QoE measurement configuration (QMC) associated with one or more service types from a first RNN serving the UE in a first cell of the wireless network via a first radio access technology (RAT). These exemplary methods can also include receiving, from a second RNN serving a second cell in the wireless network via a second RAT (i.e., different than the first RAT), a first command for handover of the UE from the first cell to the second cell. These exemplary methods can also include receiving, from the second RNN, an indication of whether the UE can perform QoE measurements via the second RAT in accordance with the QMC.

In some embodiments, the indication received from the second RNN can include a plurality of indications corresponding to QoE measurements for a respective plurality of service types.

In some embodiments, the QMC can include identifiers of one or more service types associated with the first RAT and an area scope field that includes one or more identifiers associated with the first RAT. In some embodiments, the QMC can also include identifiers of one or more service types associated with the second RAT, and the area scope field can also include one or more identifiers associated with the second RAT. In such embodiments, the identifiers associated with the first RAT and the identifiers associated with the second RAT can include one or more of the following: cell identifiers, tracking area codes (TACs), tracking area identities (TAIs), and public land mobile network identities (PLMN IDs). Table 1 above provides various examples of such identifiers.

In some embodiments, these exemplary methods can also include, based on initiating an application session corresponding to one of the service types, performing QoE measurements in accordance with the QMC.

In some of these embodiments, the application session can be initiated in the first cell and the exemplary method can also include sending, to the first RNN in response to the first command, a first measurement report for QoE measurements performed in the first cell via the first RAT. The measurement report can include an indication that the measurement report is unsolicited or event-based (e.g., due to handover). In some of these embodiments, these exemplary methods can also include selectively continuing the QoE measurements in the second cell based on the indication of whether the UE can perform QoE measurements via the second RAT in accordance with the QMC.

In other of these embodiments, the application session can be initiated in the second cell and the exemplary method can also include selectively initiating the QoE measurements in the second cell based on the indication of whether the UE can perform QoE measurements via the second RAT in accordance with the QMC.

In various embodiments, these exemplary methods can also include sending, to the second RNN, a second measurement report for QoE measurements performed in the second cell via the second RAT. This can be sent if the UE initiated or continued the measurements in the second cell. In some embodiments, if the UE continued the QoE measurements in the second cell, the second measurement report can include an indication of a mapping between a first access bearer used for the QoE measurements in the first RAT and a second access bearer used for the QoE measurements in the second RAT.

Other embodiments include radio network nodes (RNNs, e.g., base stations, eNBs, gNBs, ng-eNBs, etc., or components thereof) and user equipment (UEs, e.g., wireless devices, IoT devices, etc. or component(s) thereof) configured to perform operations corresponding to any of the exemplary methods described herein. Other embodiments include non-transitory, computer-readable media storing program instructions that, when executed by processing circuitry, configure such RNNs or UEs to perform operations corresponding to any of the exemplary methods described herein.

These and other objects, features, and advantages of embodiments of the present disclosure will become apparent

BRIEF DESCRIPTION OF THE DRAWINGS

FIG. 8 shows an ASN.1 data structure that defines an exemplary RRCConnectionReconfiguration message for LTE.

FIG. 9 shows an ASN.1 data structure that defines an exemplary otherConfig-r9 information element (IE).

FIG. 10 shows an ASN.1 data structure that defines another exemplary otherConfig-r9 IE, according to various exemplary embodiments of the present disclosure.

FIGS. 12A-B show an XML schema (e.g., data structure) for a QoE measurement configuration file, according to various exemplary embodiments of the present disclosure.

DETAILED DESCRIPTION

Figure 1:
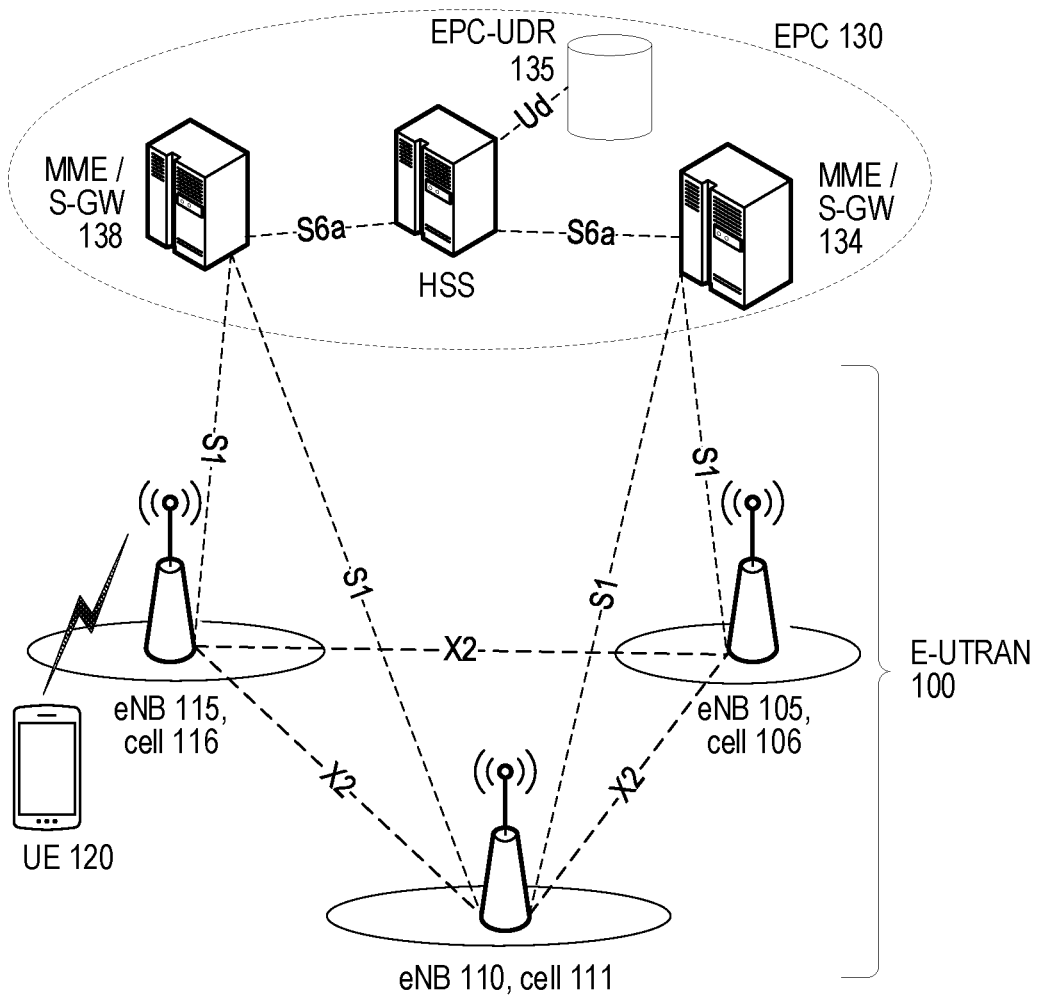
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2:
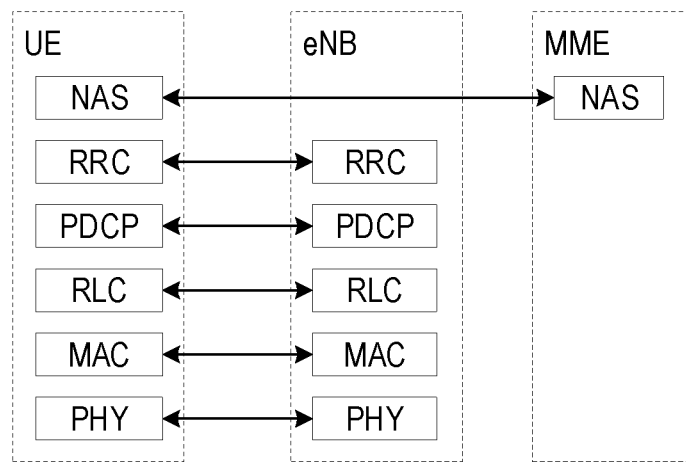
FIG. 2 is a block diagram of exemplary control plane (CP) protocol layers of the radio interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "RNN", "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, interruptions in UE QoE measurements due to inter-RAT handover can significantly reduce the utility and/or value of the QoE measurements. This is discussed in more detail below, after the following description of NR network architecture and QoE measurement collection.

Figure 3:
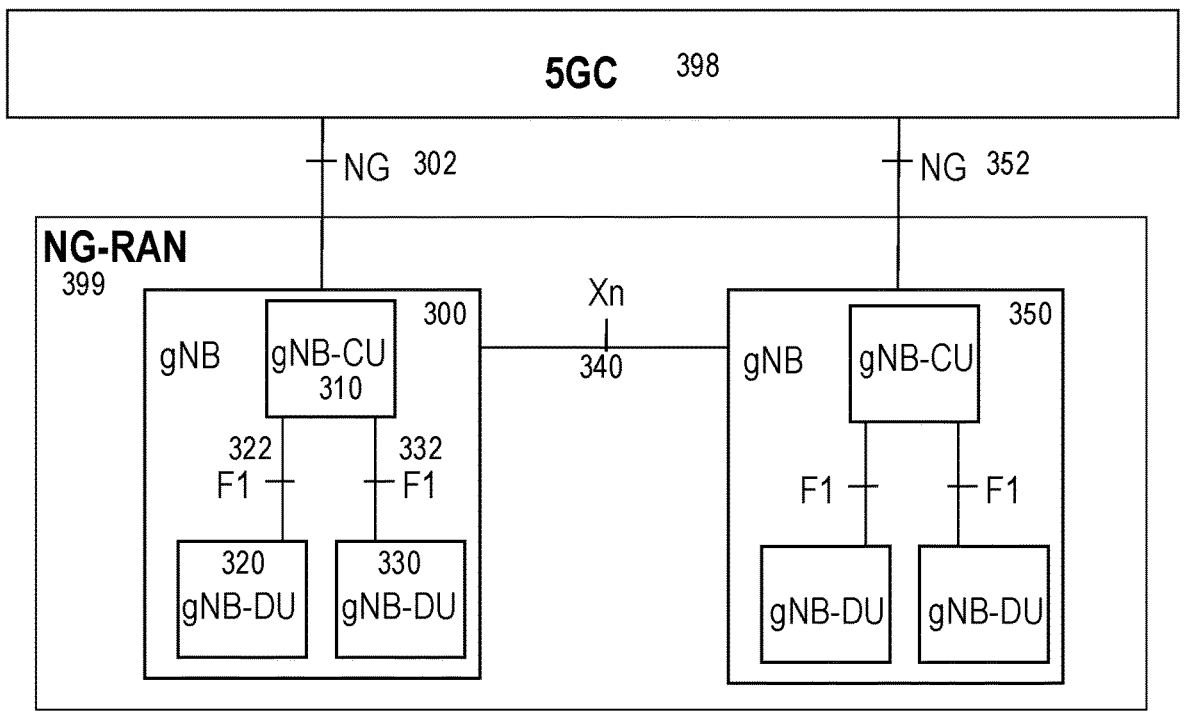
FIGS. 3-4 illustrate two high-level views of an exemplary 5G network architecture.

FIG. 3 shows a high-level view of an exemplary 5G network architecture, consisting of a Next Generation RAN (NG-RAN) 399 and a 5G Core (5GC) 398. NG-RAN 399 can include a set of gNodeB's (gNBs) connected to the 5GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is further defined in 3GPP TS 23.501 (v.15.9.0). If security protection for CP and UP data on TNL of NG-RAN interfaces is supported, NDS/IP shall be applied.

The NG-RAN nodes shown in FIG. 3 include a central (or centralized) unit (CU or gNB-CU) and one or more distributed (or decentralized) units (DU or gNB-DU). For example, gNB 300 includes gNB-CU 310 and gNB-DUs 320 and 340. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU.

Figure 4:
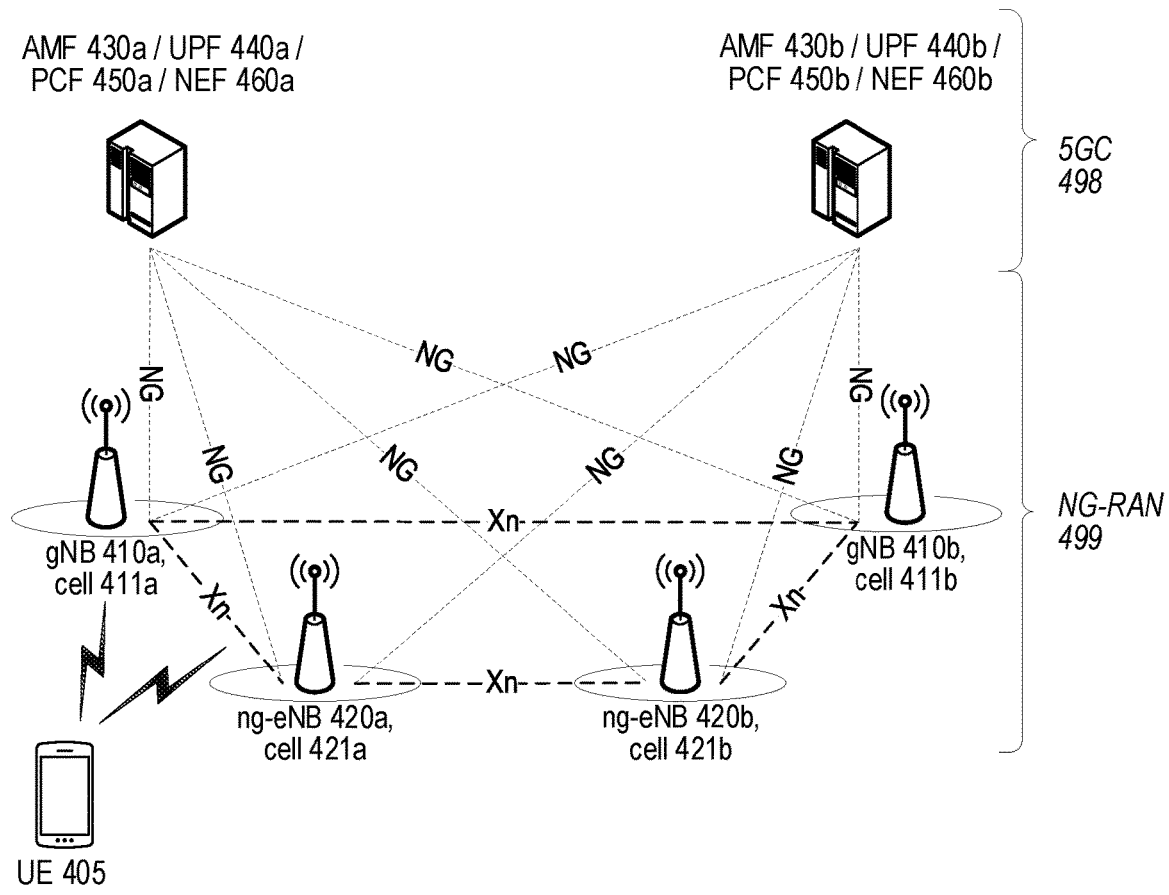

FIG. 4 shows another high-level view of an exemplary 5G network architecture, including an NG-RAN 499 and a 5GC 498. As shown in FIG. 4, NG-RAN 499 can include gNBs 410 (e.g., 410a,b) and ng-eNBs 420 (e.g., 420a,b) that are interconnected with each other via respective Xn interfaces. The gNBs and ng-eNBs are also connected via the NG interfaces to 5GC 498, more specifically to the AMF (Access and Mobility Management Function) 430 (e.g., AMFs 430a, b) via respective NG-C interfaces and to the UPF (User Plane Function) 440 (e.g., UPFs 440a,b) via respective NG-U interfaces. Moreover, the AMFs 430a,b can communicate with one or more policy control functions (PCFs, e.g., PCFs 450a,b) and network exposure functions (NEFs, e.g., NEFs 460a,b).

Each of the gNBs 410 can support the NR radio interface including frequency division duplexing (FDD), time division duplexing (TDD), or a combination thereof. In contrast, each of ng-eNBs 420 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 411a-b and 421a-b shown as exemplary in FIG. 4. Depending on the particular cell in which it is located, a UE 405 can communicate with the gNB or ng-eNB serving that particular cell via the NR or LTE radio interface, respectively.

The gNBs and ng-eNBs can also use various directional beams to provide coverage in the respective cells. In general, a DL "beam" is a coverage area of a network-transmitted reference signal (RS) that may be measured or monitored by a UE. Such RS can include any of the following, alone or in combination: synchronization signal/PBCH block (SSB), channel state information RS (CSI-RS), tertiary RS (or any other sync signal), positioning RS (PRS), demodulation reference signals (DM-RS), phase-tracking RS (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

Figure 5:
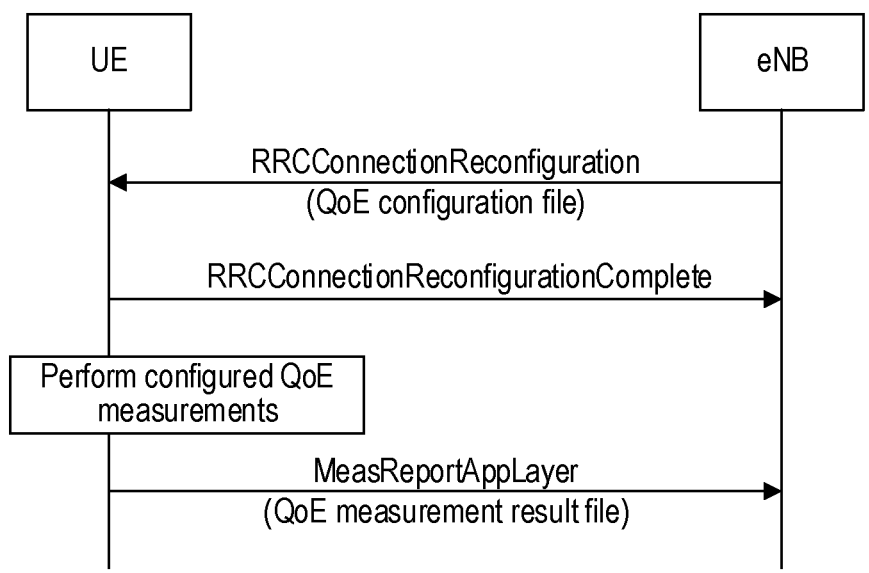
FIGS. 5-6 show signal flow diagrams that illustrate QoE measurement collection and reporting procedures by an LTE UE served by a source eNB.

FIG. 5 shows an exemplary signal flow diagram of a QoE measurement collection process for LTE, with a similar process being used in previous generation UMTS. To initiate QoE measurements by a UE in RRC_CONNECTED state, the serving eNB sends the UE an RRCConnectionReconfiguration message that includes a QoE configuration file. The QoE configuration file is an application-layer measurement configuration received by the eNB (e.g., from EPC) encapsulated in a transparent container, which is forwarded to UE in the RRC message. The UE responds with an RRCConnectionReconfigurationComplete message. Subsequently, the UE performs the configured QoE measurements and sends a MeasReportAppLayer RRC message to the eNB, including a QoE measurement result file. Although not shown, the eNB can forward this result file transparently (e.g., to EPC).

Figure 6:
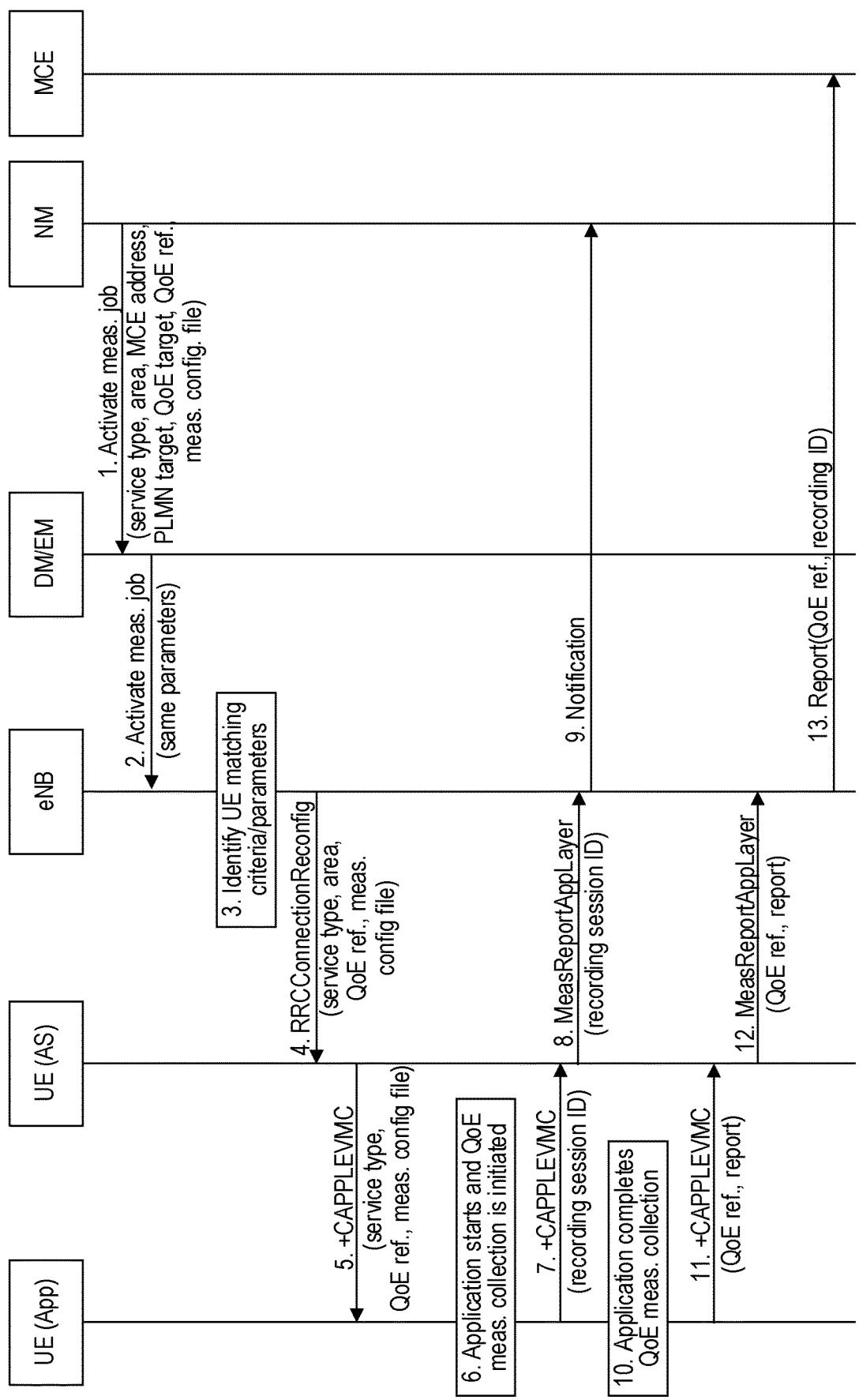
Figure 7:
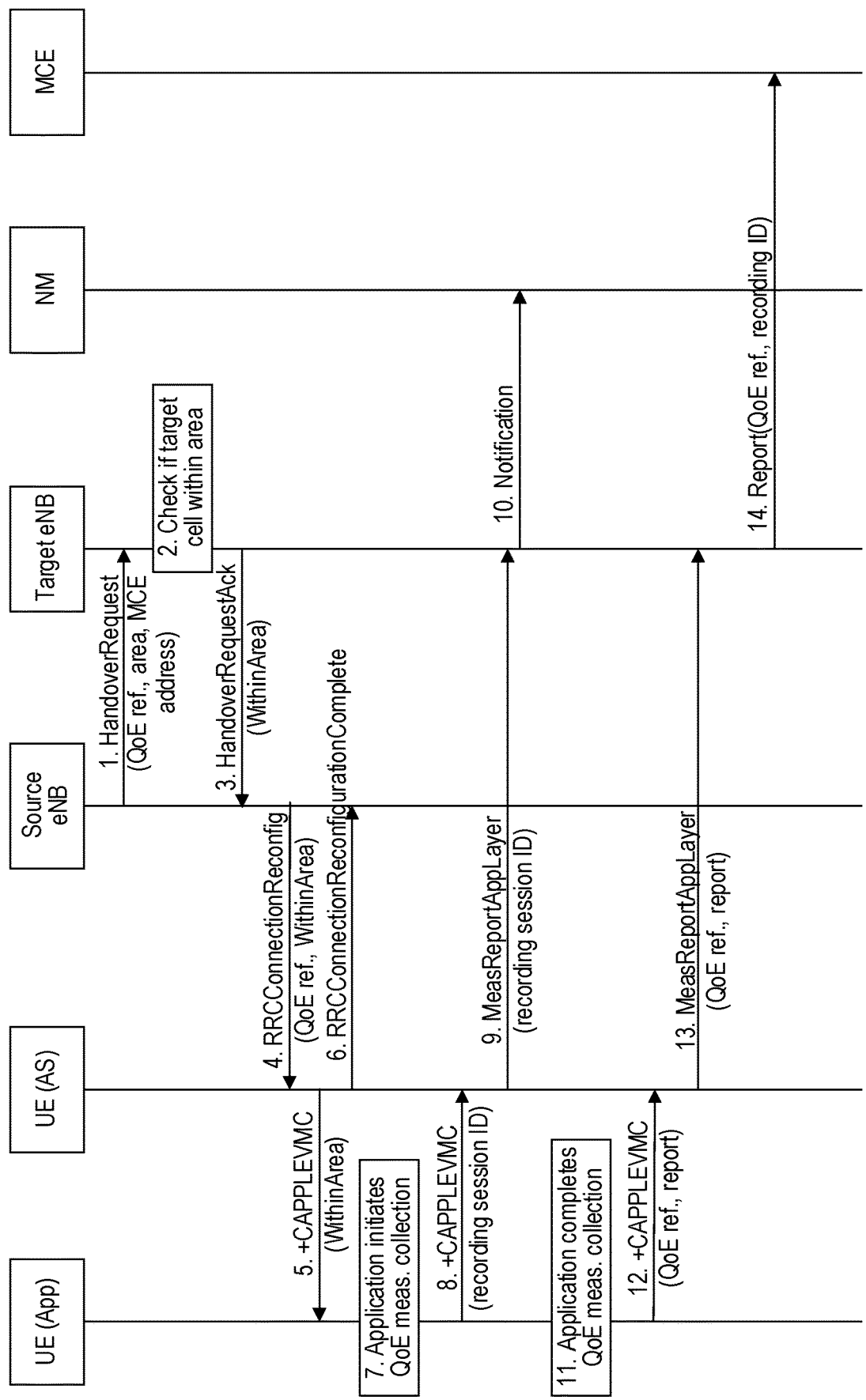
FIG. 7 shows a signal flow diagram of a procedure for handling QoE measurements during handover of a UE from a source eNB to a target eNB.

FIGS. 6-7 show more detailed signal flows of various QoE measurement collection (QMC) processes for LTE. These signal flows are between a measurement collection entity (MCE), a network manager (NM), a domain manager (DM), one or more eNBs in E-UTRAN, and the UE—particularly access stratum (AS) and application (App) parts of the UE.

In particular, FIG. 6 shows activation of QoE measurement collection and reporting of collected information without UE mobility. Although the operations shown in FIG. 6 are given numerical labels, these labels are intended to facilitate the following description rather than to require and/or imply a particular order of the operations.

In operation 1, the NM sends an Activate Measurement Job message to the DM, which forwards to the message to the eNB in operation 2. The message includes a service type (e.g., streaming), an area scope, a measurement configuration file for the QoE measurements to be performed, and a QoE reference identifier. In operation 3, the eNB identifies served cells matching the area scope, as well as UEs in these served cells that match other parameters in the message (e.g., service type). The eNB can base this determination on UE capability information sent from the UE to the eNB (not shown).

In operation 4, after identifying the UE matching the received criteria, the eNB sends an RRCConnectionReconfiguration message to the AS (e.g., RRC layer) of the UE. The eNB includes the service type, the area scope (e.g., one or more cells, tracking areas, etc.), the measurement configuration file, and the QoE reference. In operation 5, the UE AS forwards this information to the UE application part using an AT command +CAPPLEVMC, as specified in 3GPP TS 27.007 (v15.5.0).

Subsequently, in operation 6, the UE starts an application associated with the service type and initiates measurement collection according to the received configuration and area. The UE assigns this measurement collection a recording session ID and reports this ID (in operation 7) to the UE AS using the same AT command. In operation 8, the UE AS sends this ID to the eNB in a MeasReportAppLayer RRC message, and the eNB notifies the NM of the initiation of the measurement collection in operation 9.

The UE application layer completes the QoE measurement collection according to the received configuration (operation 10) and reports the results to the UE AS via AT command (operation 11) along with the associated QoE reference ID received earlier. The report can be a transparent container, as discussed earlier. In operation 12, the UE AS sends the report and the QoE reference ID to the eNB in a MeasReportAppLayer RRC message. The eNB subsequently forwards the report to the MCE (operation 13).

In addition, FIG. 7 shows a process for handling of QoE measurements during handover of a UE from a source eNB to a target eNB. In this scenario, the UE may have previously received a QoE measurement configuration (e.g., as in FIG. 6) but has not yet initiated measurements according to the configuration. In operation 1, the source eNB sends a HandoverRequest message to the target eNB in relation to handing over the UE to a target cell served by the target eNB. The message includes a QoE reference ID and an associated area scope for the measurements. In operation 2, the target eNB checks whether the target cell is within the area scope and, based on determining that the target cell is within the area scope, sends a HandoverRequestAck message (operation 3) to the source eNB indicating this result ("WithinArea").

In operation 4, the source eNB sends an RRCConnectionReconfiguration message to the AS (e.g., RRC layer) of the UE, and includes the "WithinArea" indicator, optionally together with one or more handover-related parameters. The UE AS sends this indicator to the application layer with the AT command +APPLEVMC (operation 5) and responds to the source eNB with an RRCConnectionReconfigurationComplete message (operation 6). In operation 7, the UE application layer initiates measurement collection according to the previously received configuration. Operations 8-14 are similar to operations 7-13 in FIG. 6, except that they are performed in relation to the target eNB after handover of the UE.

A new study item for "Study on NR QoE management and optimizations for diverse services" has been approved for NR Rel-16. The purpose is to study solutions for QoE measurements in NR, not only for streaming services as in LTE but also for other services such as augmented or virtual reality (AR/VR), URLLC, etc. Based on requirements of the various services, the NR study will also include more adaptive QoE management schemes that enable intelligent network optimization to satisfy user experience for diverse services.

The QoE measurements made in an NG-RAN may be initiated by a management function (e.g., O&M) in a generic way for a group of UEs, or they may be initiated by the core network (e.g., 5GC) towards a specific UE based on signaling with the NG-RAN. As mentioned above, the configuration of the measurement includes the measurement details, which is encapsulated in a container that is transparent to the NG-RAN.

In general, the RAN (e.g., E-UTRAN or NG-RAN) is not aware of an ongoing streaming session for a UE nor of when QoE measurements are being performed by the UE. Even so, it is important for the client or management function analyzing the measurements that the entire streaming session is measured. It is beneficial, then, that the UE maintains QoE measurements for the entire session, even during handover situation. It has been concluded during a 3GPP study that fragmented QoE reports are of little use. However, it is an implementation decision when RAN stops the QoE measurements. For example, it could be done when the UE has moved outside the measured area, e.g., due to a handover.

An inter-RAT handover occurs between different radio access technologies, e.g., between NR and LTE, between LTE and UMTS, etc. As further defined in 3GPP TS 38.300 (v15.5.0) section 9.3.1.2, an inter-RAT handover from a source RAT to a target RAT has the following characteristics:

The source RAT configures the target RAT measurement and reporting.
The source RAT decides on the preparation initiation and provides the necessary information to the target RAT in the format required by the target RAT:
For handover preparation from E-UTRA to NR, the source RAT issues a handover preparation request message to the target RAT passing a transparent RRC container with necessary information to prepare the handover at the target side. The information for the target RAT is the same type as specified in 3GPP TS 38.300 section 9.2.3.2.1 including the current QoS flow to DRB mapping applied to the UE and RRM configuration.
The details of RRM configuration are the same type as specified for NR in 3GPP TS 38.300 section 9.2.3.2.1 including beam measurement information for the listed cells if the measurements are available.

Radio resources are prepared in the target RAT before the handover.

The RRC reconfiguration message from the target RAT is delivered to the source RAT via a transparent container, and is passed to the UE by the source RAT in the handover command:

The inter-RAT handover command message carries the same type of information required to access the target cell as specified for NR baseline handover in 3GPP TS 38.300 section 9.2.3.2.1.

The in-sequence and lossless handover is supported for the handover between gNB and ng-eNB.

Both Xn- and NG-based inter-RAT handover between NG-RAN nodes is supported. Whether the handover is over Xn or CN is transparent to the UE.

In order to keep the SDAP and PDCP configurations for in-sequence and lossless inter-RAT handover, delta-configuration for the radio bearer configuration is used.

In early deployments, NR coverage may be limited to certain areas but can be supplemented in and/or around these areas by existing LTE and/or UMTS coverage. As such, there is expected to be a significant number of UE handovers between cells supporting NR and cells supporting LTE and/or UMTS but not NR. If a UE initiated configured QoE measurements in an LTE cell but is later handed over to an NR cell, there is no mechanism for continuing the ongoing QoE measurements in NR. Similarly, if a UE has initiated configured QoE measurements in an NR cell but is later handed over to an LTE cell, there is no mechanism for continuing the ongoing QoE measurements in LTE. As such, these QoE measurements will be interrupted while the UE is in the handover target cell that uses a different RAT than the cell in which the QoE measurements were initiated. These interruptions can significantly reduce the utility and/or value of the QoE measurements.

Accordingly, exemplary embodiments of the present disclosure provide techniques that facilitate the continuation of QoE measurements, initiated while the UE was being served by a cell of a first RAT, when the UE moves to a cell of a second RAT. For example, such QoE measurements will not be interrupted when the UE moves between LTE and NR. As such, the application-layer measurements can continue no matter which RAT serves the UE. Other exemplary embodiments provide techniques that facilitate the continuation of QoE measurements, initiated while the UE was being served by the cell of a first RAT, when the UE returns to a cell of the first RAT after being in a cell of the second RAT. For example, the LTE QoE measurements will resume when the UE returns to LTE after having moved from LTE to NR. Advantages include larger QoE measurement sets that facilitate better network planning and management for provisioning of services (e.g., streaming, etc.) that meet end-user experience requirements. Furthermore, by continuing measurements across different RATs, the resulting measurements can provide valuable insight into how the type of RAT impacts the user experience in the application layer.

At a high level, various embodiments are related to the scenario in which the UE is first configured with a QoE measurement configuration in a first RAT (e.g., LTE). The QoE measurement configuration contains a measurement configuration file to be applied in the application layer in the UE. It may also contain the service type, area scope or withinArea indication, and more information related to the QoE configuration (e.g., whether segmentation is allowed or not). The QoE measurement configuration can be sent to the UE in an RRC message, such as an RRCConnectionReconfiguration (in LTE) or RRCReconfiguration (in NR), collectively referred to as reconfiguration messages. Examples of the former are shown in FIGS. 5-7, discussed above.

The UE may or may not start performing the QoE measurements based on the received configuration while being served by the first RAT. Subsequently, the UE receives a reconfiguration message for handover or other mobility operation to an NR cell. If the UE had started the configured QoE measurements in the first RAT, the UE may continue the measurements in the second RAT. If the UE had not initiated the configured measurements in the first RAT, the UE may initiate the measurements in the second RAT when an application associated with the configured service type starts.

At the handover, the UE receives a reconfiguration message with the target cell configuration. The message is created by the target node but is sent to the UE from the source node in an encapsulated container. The message can include a QoE configuration for the target node, but this approach can result in significant overhead for handover signaling. Accordingly, in some embodiments, the UE can be provided with an indication of whether the previous QoE measurement configuration should be maintained after handover. For example, this can be indicated in a similar manner as the withinArea indicator (FIG. 7) indicates that the handover target cell is still within the area scope associated with the existing QoE measurement configuration. As a more specific example, the withinArea can further indicate that the existing UE should be maintained even if the target cell is inter-RAT with respect to the source cell.

FIG. 8 shows an ASN.1 data structure that defines an exemplary RRCConnectionReconfiguration message for LTE. Of particular interest to the present discussion is the otherConfig-R9 field of the RRCConnectionReconfiguation-v920-IEs in FIG. 8. Moreover, FIG. 9 shows an ASN.1 data structure that defines an exemplary otherConfig-r9 IE such as included in the data structure of FIG. 8. Note that a subfield within the otherConfig-r9 IE is withinAreaHandoverAppLayer, which indicates at handover, for each application layer measurement type, whether the UE will be inside the specified area after the handover. According to above-described embodiments, this indication can also be applicable for inter-RAT handovers.

In other embodiments, a distinct indicator can be used to indicate to the UE that the QoE measurements configured in one RAT should continue in the second RAT. FIG. 10 shows an ASN.1 data structure that defines an exemplary otherConfig-r9 IE according to these embodiments. In contrast to FIG. 9, only a portion of the exemplary otherConfig-r9 IE is shown in FIG. 10. The portion shown includes a newly-defined continueMeasAppLayer-r17 IE that can indicate, for each application layer measurement type, whether the UE shall continue the application layer measurements after the inter-RAT handover.

If the UE AS receives the indication that the measurements should continue for all service types, the UE AS does not need to perform any actions towards the application layer. The measurements continue in the application layer as before. If the UE AS receives an indication that the measurements should be stopped for some service types, but not for other service types, the application layer needs to be informed. AT commands, specified in 3GPP TS 27.007 (v15.5.0) for communication between AS and application layer, already support stopping QoE measurements. This support can be extended to stopping QoE measurements for a particular service type. The following is some exemplary specification text for 3GPP TS 27.007, in which the <app-meas_continue-meas> field is used as an indicator according to these embodiments:

\*\*\*Begin text for 3GPP TS 27.007\*\*\*

8.78 Application Level Measurement Configuration +CAPPLEVMC

TABLE 8.78-1

+CAPPLEVMC parameter command syntax

| Command | Possible response(s) |
|---|---|
| +CAPPLEVMC = [<n>] | +CME ERROR: <err> |
| +CAPPLEVMC? | +CAPPLEVMC: <n> |
| +CAPPLEVMC = ? | +CAPPLEVMC: (list of supported <n>s) |

Description

This command allows control of the application level measurement configuration according to 3GPP TS 25.331 [74] and 3GPP TS 36.331 [86]. The set command controls the presentation of the unsolicited result code +CAPPLEVMC: <app-meas_service_type>, <start-stop_reporting>[, <app-meas_config_file_length>, <app-meas_config-file>] providing data for the configuration. Refer subclause 9.2 for possible <err> values.

Read command returns the current value of <n>.

Test command returns values supported as a compound value.

Defined Values

<n>: integer type. Disable and enable presentation of the unsolicited result code +CAPPLEVMC to the TE.
0 Disable presentation of the unsolicited result code
1 Enable presentation of the unsolicited result code <app-meas_service_type>: integer type. Contains the indication of what application that is target for the application level measurement configuration.
1 QoE measurement collection for streaming services
2 QoE measurement collection for MTSI services <start-stop_eporting>: integer type. Indicates the start and stop of the application level measurement reporting for the application indicated by the <app-meas_service_type>.
0 start the application level measurement reporting
1 stop the application level measurement reporting <app-meas_config_file_length>: integer type. Indicates the number of octets of the <app-meas_config-file> parameter.

<app-meas_config-file>: string of octets. Contains the application level measurement configuration file for the application indicated by the <app-meas_service_type>. The parameter shall not be subject to conventional character conversion as per +CSCS.

<app-meas_continue-meas>: integer type. Contains an indication of whether measurements for the indication service type is still within the area, also at change of RAT.
0 measurement continuation is not allowed
1 measurement continuation is allowed Implementation: Optional.

\*\*\*End text for 3GPP TS 27.007\*\*\*

In the case of QoE measurement activation based on core network signaling (e.g., for specific UE), an eNB or gNB connected to the EPC receives the QoE measurement configuration via the S1AP protocol. Similarly, an eNB or gNB connected to the 5GC can receive the QoE measurement configuration via the NGAP protocol. If the measurements can continue between LTE and NR, the configuration for both LTE and NR needs to be included in the configuration.

Figure 11:
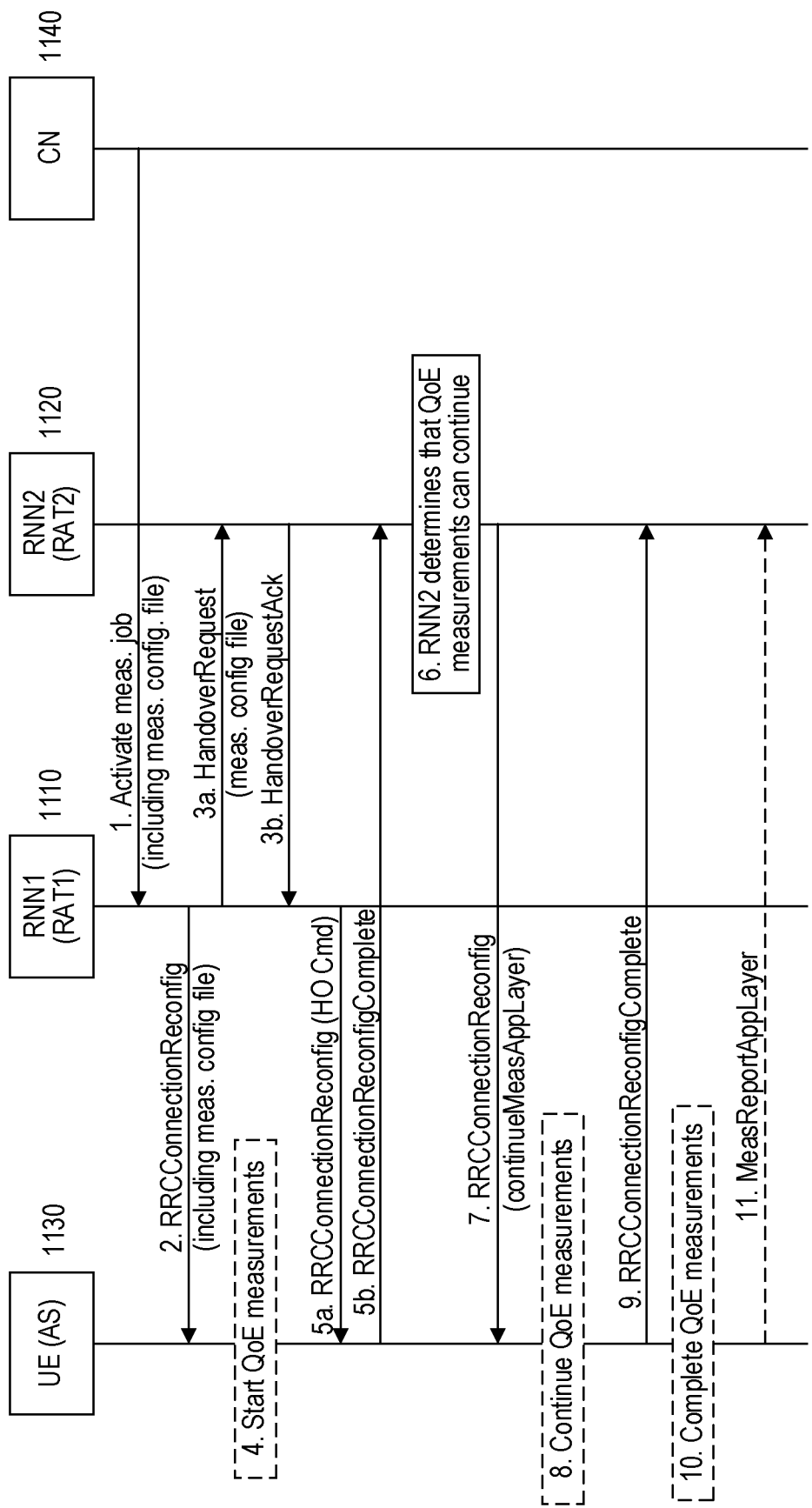
FIG. 11 shows a signal flow diagram between a UE and various network elements, according to various exemplary embodiments of the present disclosure.

FIG. 11 shows a signal flow diagram the further illustrates various embodiments described above. The signal flows are between a UE, a first radio network node (RNN1) that utilizes a first RAT (RAT1), a second radio network node (RNN2) that utilizes a second RAT (RAT2), and a core network (CN, e.g., EPC, 5GC). The UE AS and application layer (App) are shown as one in FIG. 11 with internal signaling omitted for brevity. Although the operations shown in FIG. 11 are given numerical labels, these labels are intended to facilitate the following description rather than to require and/or imply a particular order of the operations.

In operation 1, the CN sends RNN1 an Activate Measurement Job message including a QoE measurement configuration file. In operation 2, RNN1 sends the QoE measurement configuration to the UE. Optionally, in operation 3, the UE starts QoE measurements according to the received configuration. In operation 4a, after determining that the UE should be handed over to a target cell served by RNN2, RNN1 sends a handover request message to RNN2 that includes the QoE measurement configuration for the UE. After determining that the UE can be admitted to the target cell, RNN2 responds with a handover request acknowledgement message (operation 4b).

RNN1 sends an RRCConnectionReconfiguration message with a handover command to the UE (operation 5a). After performing the handover to the target cell, the UE sends RNN2 an RRCConnectionReconfigurationComplete message (operation 5b) indicating that the handover is complete. Based on the QoE measurement configuration received in operation 3, RNN2 determines that the QoE measurements can continue on RAT2 in the target cell (operation 6). RNN2 sends the UE an RRCConnectionReconfiguration message with a continueMeasAppLayer indicator, such as in the otherConfig-r9 IE shown in FIG. 10. If the UE has started QoE measurements in operation 4, the UE continues such measurements based on the received indicator (operation 8) and responds to RNN2 with an RRCConnectionReconfigurationComplete message (operation 9). Optionally, the UE completes the configured QoE measurements (operation 10) and sends a report including the measurements to RNN2 (operation 11).

As mentioned above, the area scope defines the area where the QoE measurements should be performed. If the measurements can continue between LTE and NR, the area scope needs to be extended to cover both LTE and NR. Tracking Area Code (TACs) and cell IDs have slightly different formats in LTE and NR, such that signaling of both formats should be supported. Furthermore, MCE (or TCE) addresses to which eNBs forward UE QoE measurements made in LTE may be different than MCE addresses to which gNBs forward UE QoE measurements made in NR.

Table 1 below shows definitions of various fields of a UE Application Layer Measurement Configuration IE, according to various embodiments of the present disclosure. This IE defines configuration information for the QoE Measurement Collection (QMC) function for LTE and can be included in an RRCConnectionReconfiguration message sent by an eNB to a UE, as discussed above. The "Area Scope of QMC" field of this IE can be based on lists of cell IDs, tracking area codes (TACs), or tracking area identities (TAI). As shown in Table 1, these can be extended to include lists of NR cell IDs, 5GC TACs, or 5GC TAIs in addition to the existing LTE cell IDs, EPC TAs, or EPC TAIs. An additional indicator of NR service types can also be included in some embodiments.

TABLE 1

| IE/Group Name | Presence | Range | IE type/ref. | Semantics description |
|---|---|---|---|---|
| Container for application layer measurement configuration | M | | Octet string (1 . . . 1000) | Indicates application layer measurement configuration, see Annex L in [43]. |
| CHOICE Area Scope of *Q* MC | M | | | |
| >Cell based | | | | |
| >>Cell ID List for QMC | | 1 . . . <maxnoofCellIDfor*Q* MC> | | |
| >>>E-CGI | M | | 9.2.1.38 | |
| >>Cell ID List for QMC NR | | 1 . . . <maxnoofCellIDfor*Q* MCNR> | | |
| >>>NR CGI | M | | 9.2.1.142 | |
| >TA based | | | | |
| >>TA List for QMC | | 1 . . . <maxnoofTAfor*Q* MC> | | |
| >>>TAC | M | | 9.2.3.7 | The TAI is derived using the current serving PLMN. |
| >>TA List for QMC NR | | 1 . . . <maxnoofTAfor*Q* MCNR> | | |
| >>>5GS TAC | M | | 9.2.3.53 | The TAI is derived using the current serving PLMN. |
| >TAI based | | | | |
| >>TAI List for QMC | | 1 . . . <maxnoofTAfor*Q* MC> | | |
| >>>TAI | M | | 9.2.3.16 | |
| >>TAI List for QMC NR | | 1 . . . <maxnoofTAfor*Q* MCNR> | | |
| >>>5GS TAI | M | | 9.2.3.52 | |
| >PLMN area based | | | | |
| >>PLMN List for QMC | | 1 . . . <maxnoofPLMNfor*Q* MC> | | |
| >>>PLMN Identity | M | | 9.2.3.8 | |
| Service Type | M | | ENUMERATED (QMC for streaming service, QMC for MTSI service, . . . ) | This IE indicates the service type of UE application layer measurements. |
| Service Type NR | M | | ENUMERATED (QMC for streaming service, QMC for MTSI service, . . . ) | This IE indicates the service type of UE application layer measurements in NR. |

If the application layer measurements can continue across cells of different RATs, information transfer between radio network nodes (e.g., eNBs, gNBs) serving the cells is necessary. For example, this can be done via signaling with the core network (e.g., EPC, 5GC) via S1AP and/or NGAP protocols. For example, information about the measurement configuration in the source cell can be sent from the source eNB/gNB in a HANDOVER REQUIRED message, and also included in a HANDOVER REQUEST message to the target eNB/gNB. A Trace Activation IE is already included in HANDOVER REQUEST (as defined in 3GPP TS 36.413 (v15.8.0) for LTE), but it would need to be added in HANDOVER REQUIRED. Additionally, an IE similar to the UE Application Layer Measurement Configuration shown in Table 1 above would need to be included in the NGAP Trace Activation IE so that the UE's current QoE configuration can be passed on to the target eNB/gNB.

For handover based on signaling directly between eNBs and gNBs (i.e., without involving a core network), an IE similar to the UE Application Layer Measurement Configuration shown in Table 1 above would need to be included in the existing Trace Activation IE of the XnAP protocol (as defined in 3GPP TS 38.424 v15.2.0). In case of inter-RAT conditional handover (CHO), the source eNB/gNB should include the measurement continuation indication only in handover requests towards the target cells corresponding to the cell list/TAI/TAC indicated in the QoE measurement configuration.

In some embodiments, the QoE measurement configuration file can also be enhanced with additional information to support inter-RAT QoE measurement reporting. For example, QoE reporting for dynamic adaptive streaming over HTTP (DASH) can be enhanced as specified in the following proposed text for 3GPP TS 26.247 in combination with the exemplary XML schema (e.g., data structure) shown in FIGS. 12A-B.

*Begin text for 3GPP TS 26.247*

10.5 Quality Reporting Scheme for DASH

This section specifies a 3GP-DASH quality reporting scheme.

The quality reporting scheme is signaled using in the Reporting element in the Metrics element. The URN to be used for the Reporting@schemeIdUri shall be "urn:3GPP:ns:PSS:DASH:QM10".
The reporting scheme shall use the quality reporting protocol defined in section 10.6.
The semantics and XML syntax of the scheme information for the 3GP-DASH quality reporting scheme are specified in Table 34 and Table 35, respectively.

For DASH QoE reporting, the UE needs to indicate the access bearer on which the measurements have been performed when reporting average throughput observed by the application during the measurement interval, as shown in the Table 2 below. However, for inter-RAT handover between LTE and NR, there is a mapping between source RAT E-RAB or DRB ID to target RAT E-RAB or DRB ID, and the MCE (or TCE) needs to be aware of this mapping. There are several alternatives for indicating this mapping.

TABLE 34

Semantics of Quality Reporting Scheme Information

| Element or Attribute Name | Use | Description |
|---|---|---|
| @apn | O | This attribute gives the access point that should be used for sending the QoE reports. |
| @format | O | This field gives the requested format for the reports. Possible formats are: "uncompressed" and "gzip". |
| @samplepercentage | O | Percentage of the clients that should report QoE. The client uses a random number generator with the given percentage to find out if the client should report or not. |
| @reportingserver | M | The reporting server URL to which the reports will be sent. |
| @reportinginterval | O | Indicates the time(s) reports should be sent. If not present, then the client should send a report after the streaming session has ended. If present, @reportingInterval = n indicates that the client should send a report every n-th second provided that new metrics information has become available since the previous report. For each report sent, only the newly collected information since the previous report shall be reported. |
| LocationFilter | 0 . . . 1 | When present, this element indicates the geographic area(s) or location(s) where quality metric collection is requested. When not present, quality metric collection is requested regardless of the device's location. The LocationFilter element comprises one or more instances of any combination of targeted cell-IDs, polygons and circular areas. Each cell-ID entry in LocationFilter is announced in cellList, and each polygon and circular area entry is announced in the polygonList or and circularAreaList elements, respectively. |
| cellList | 0 . . . N | This element specifies a list of cell identified by E-UTRAN-CGI or other CGI. |
| shape | | Geographic area comprising one or more instances of polygonList and/or circularAreaList elements. |
| polygonList | 0 . . . N | This element, when present, comprises a list of 'Polygon' shapes as defined by OMA MLP[51]. |
| @confLevel | O | This attribute indicates the probability in percent that the DASH client is located in the corresponding polygon area. It is defined as 'lev_conf' by OMA MLP. If not present, it has default value of 60. |
| circularAreaList | 0 . . . N | This element, when present, comprises a list of 'CircularArea' shapes as defined by OMA MLP[51]. |
| @confLevel | O | This attribute indicates the probability in percent that the DASH client is located in the corresponding circular area. It is defined as 'lev_conf' by OMA MLP. If not present, it has default value of 60. |

Legend:
Elements are bold; attributes are non-bold and preceded with an @
For attributes: M = Mandatory, O = Optional,.
For elements: <minOccurs> . . . <maxOccurs> (N = unbounded)
* End text for 3GPP TS 26.247 *

TABLE 2

| Key | Type | Description |
| --- | --- | --- |
| AvgThroughput | Object | Average throughput that is observed by the client during the measurement interval |
| numbytes | Integer | The total number of the content bytes, i.e. the total number of bytes in the body of the HTTP responses, received during the measurement interval. |
| activitytime | Integer | The activity time during the measurement interval in milliseconds. The activity time during the measurement interval is the time during which at least one GET request is still not completed (i.e. excluding inactivity time during the measurement interval). |
| t | Real Time | The real time of the start of the measurement interval |
| duration | Integer | The time in milliseconds of the measurement interval |
| accessbearer | String | Access bearer for the TCP connection for which the average throughput is reported |
| inactivitytype | Enum | Type of the inactivity, if known and consistent throughout the reporting period: User request (e.g. pause) Client measure to control the buffer Error case |

In some embodiments, just prior to the handover, the UE can send an interim measurement report via the source eNB/gNB. This can be done by modifying @reportinginterval in Table 34 of the exemplary text for 3GPP TS 26.247 shown above, or by introducing a new attribute (e.g., @eventbasedreporting) to enable unsolicited or event-based reporting from the UE.

Another alternative is to modify the 3GPP TS 26.247 accessbearer attribute in Table 2 above to include the mapping of access bearer ID used prior to inter-RAT handover and the corresponding access bearer ID after the inter-RAT handover. This would accommodate the case where two consecutive reports are sent from different RATs (e.g., due to the inter-RAT handover in-between two reporting occasions).

In some scenarios, QoE measurements configured in a first (or source) RAT cannot be continued in a second (or target) RAT. This can be due to various reasons. For example, the second RAT may not be able to support the QoE measurements that were configured in the first RAT, or the services for which the QoE measurements were configured in the first RAT are not supported in the second RAT. As another example, QoE measurements may not be configured for certain RATs.

As mentioned above, exemplary embodiments of the present disclosure provide techniques that facilitate the resumption of QoE measurements, initiated while the UE was being served by a cell of a first RAT, when the UE returns to a cell of the first RAT after being in a cell of the second RAT. In other words, such techniques facilitate pausing QoE measurements initiated in the first RAT upon handover to a second RAT and resuming the stopped/paused measurements upon return to the first RAT. If the QoE measurements were not started in the first RAT, the QoE measurements may be started only upon return to the first RAT.

These embodiments follow principles similar to those described above except that, when the UE hands over to the target RAT, the QoE measurement configuration transferred to the target node is stored by the target node rather than being applied to the UE. Subsequently, the QoE configuration can be signaled as part of the handover procedure every time the UE moves between cells. When the UE moves back to the first RAT where the QoE measurements were configured, the network node receiving the QoE measurement configuration can provide it to the UE (e.g., in a handover-related message or in a separate message). In this manner, continuity of QoE measurements within the first RAT can be maintained.

Figure 13:
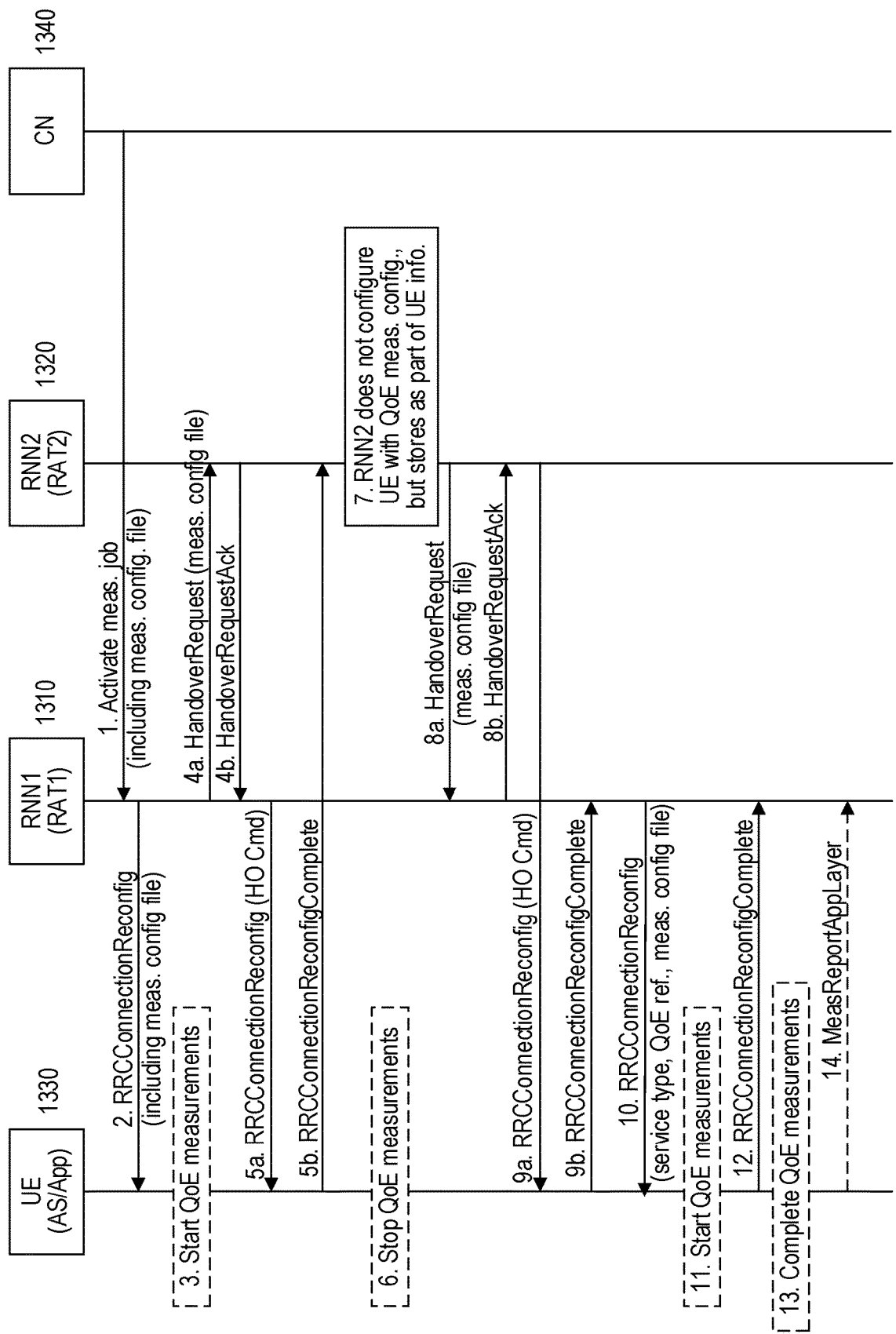
FIG. 13 shows a signal flow diagram between a UE and various network nodes, according to various exemplary embodiments of the present disclosure.

FIG. 13 shows a signal flow diagram that further illustrates these embodiments. Similar to FIG. 11, the signal flows are between the UE, RNN1 that utilizes the first RAT (RAT1), RNN2 that utilizes a second RAT (RAT2), and a core network (CN, e.g., EPC, 5GC). The UE AS and application layer (App) are shown as one in FIG. 13 with internal signaling omitted for brevity. Although the operations shown in FIG. 13 are given numerical labels, these labels are intended to facilitate the following description rather than to require and/or imply a particular order of the operations.

Operations 1-5 are substantially similar to operations 1-5 in FIG. 11. If the UE previously started QoE measurements in operation 3, the UE stops the QoE measurements in operation 6 after moving to RAT2. In operation 7, rather than configuring the UE, RNN2 stores the QoE measurement configuration received in operation 4a. In operation 8a, after determining that the UE should be handed over to a target cell served by RNN1, RNN2 sends a handover request message to RNN1 that includes the QoE measurement configuration for the UE. After determining that the UE can be admitted to the target cell, RNN1 responds with a handover request acknowledgement message (operation 8b).

RNN2 sends an RRCConnectionReconfiguration message with a handover command to the UE (operation 9a). After performing the handover to the target cell, the UE sends RNN1 an RRCConnectionReconfigurationComplete message (operation 9b) indicating that the handover is complete. In operation 10, RNN1 sends the UE an RRCConnectionReconfiguration message with the QoE measurement configuration received from RNN2 in operation 8a. If the UE has stopped or paused QoE measurements in operation 6, the UE starts or resumes such measurements based on the received configuration (operation 11) and responds to RNN1 with an RRCConnectionReconfigurationComplete message (operation 12). Optionally, the UE completes the configured QoE measurements (operation 13) and sends a report including the measurements to RNN2 (operation 14).

Figure 14:
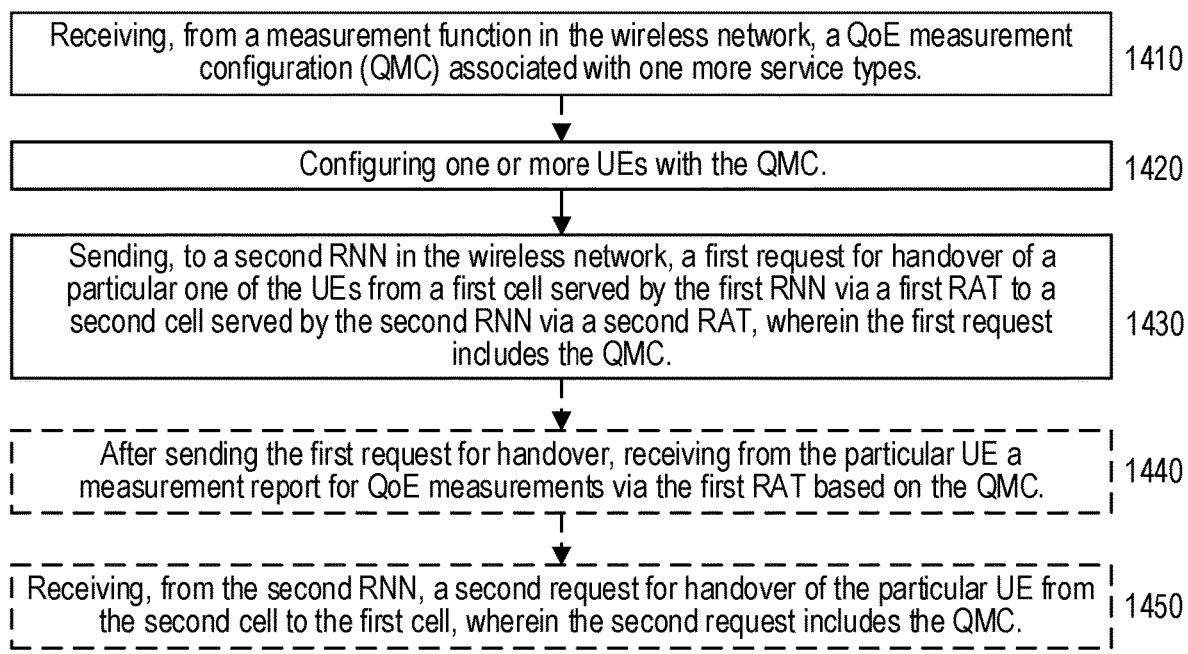
FIG. 14 is a flow diagram of an exemplary method (e.g., procedure) for a first radio network node (RNN, e.g., eNB, gNB, ng-eNB, etc. or component(s) thereof), according to various exemplary embodiments of the present disclosure.
Figure 15:
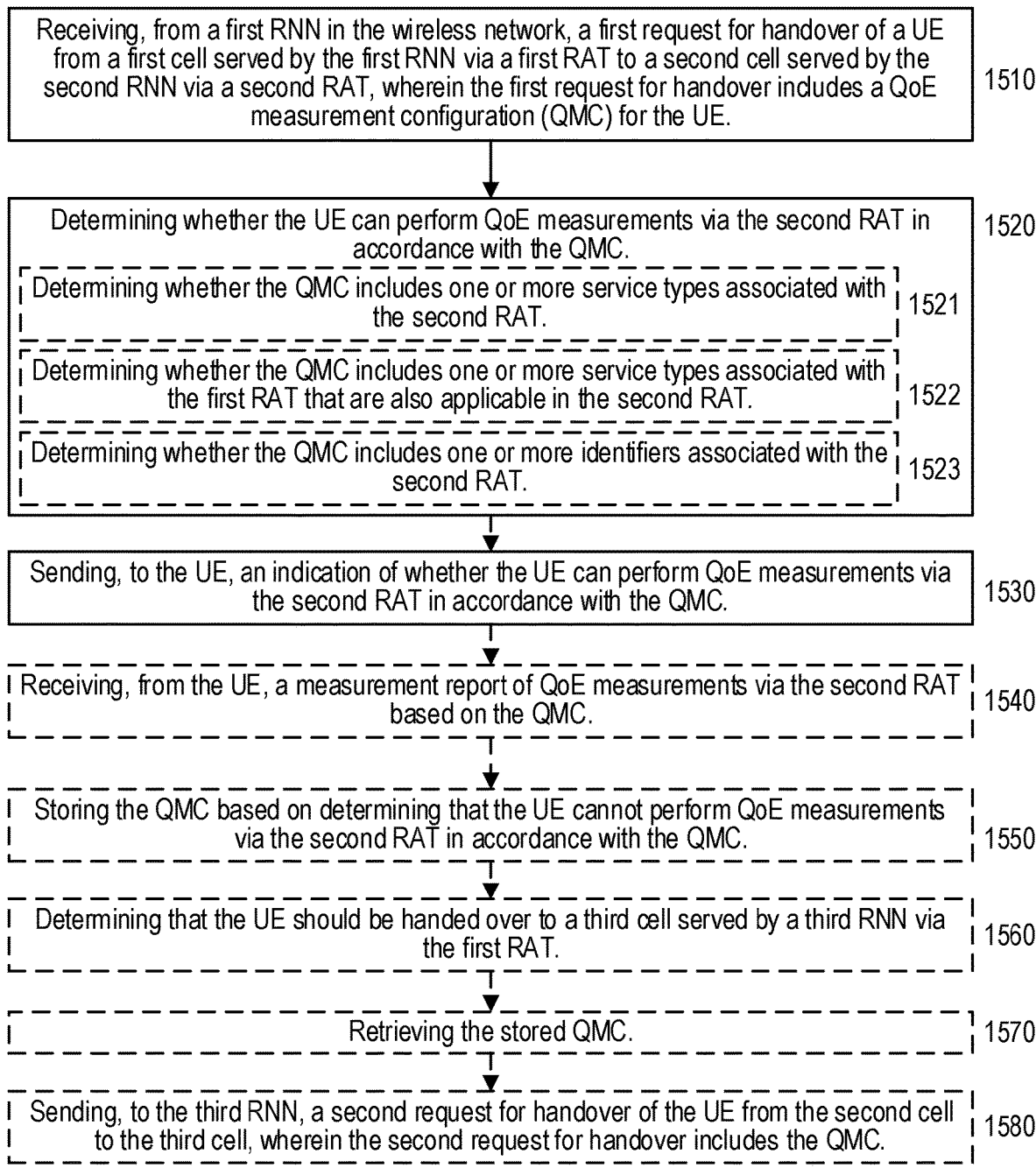
FIG. 15 is a flow diagram of an exemplary method (e.g., procedure) for a second RNN (e.g., eNB, gNB, ng-eNB, etc. or component(s) thereof), according to various exemplary embodiments of the present disclosure.
Figure 16:
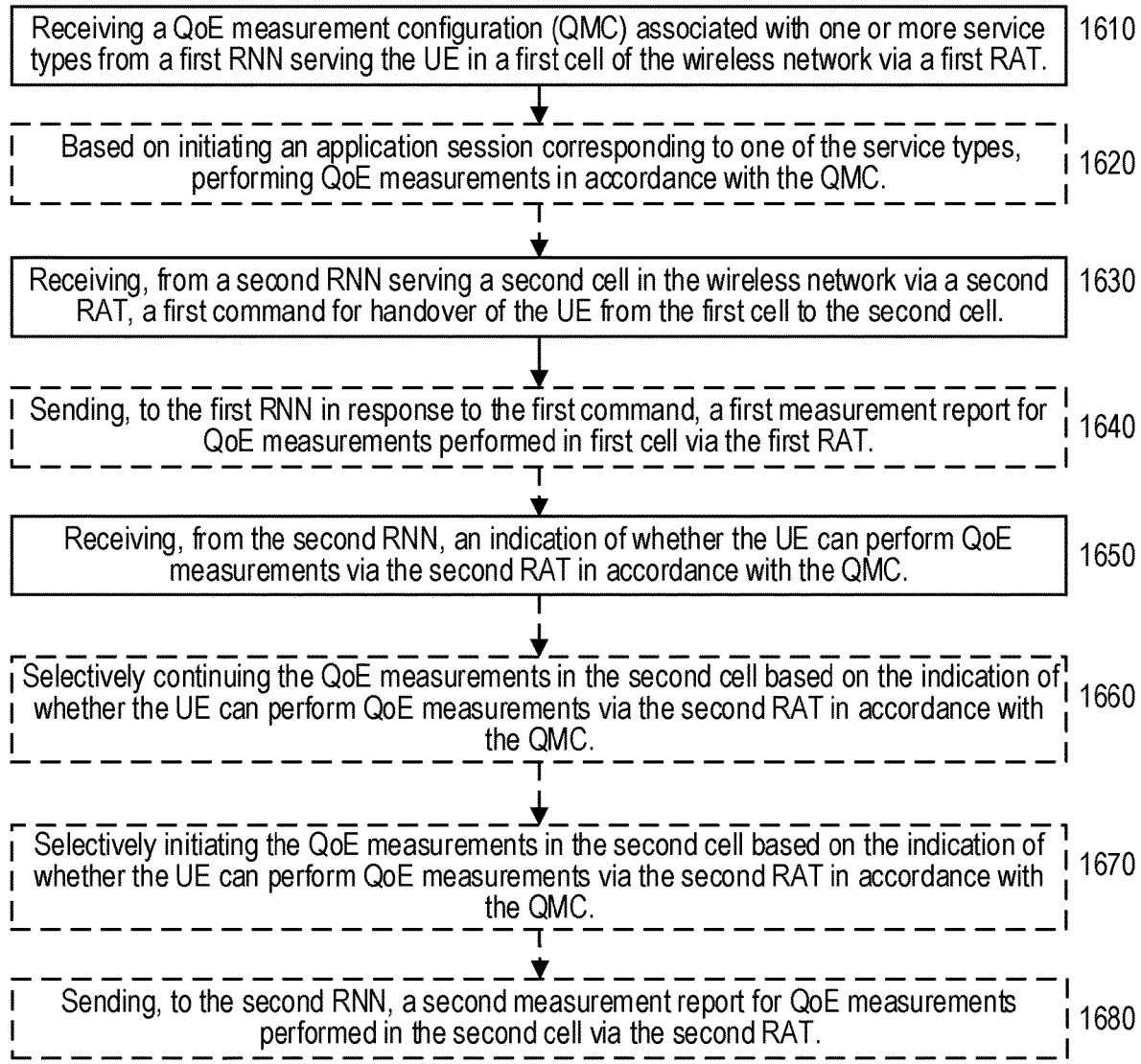
FIG. 16 is a flow diagram of an exemplary method (e.g., procedure) for a UE (e.g., wireless device, IoT device, etc. or component(s) thereof), according to various exemplary embodiments of the present disclosure.

The embodiments described above can be further illustrated with reference to FIGS. 14-16, which show exemplary methods (e.g., procedures) performed by radio network nodes (RNNs) and UEs. Put differently, various features of the operations described below correspond to various embodiments described above. These exemplary methods can also be used and/or performed cooperatively (e.g., with each other and/or with other procedures described herein) to provide various exemplary benefits and/or advantages. Although FIGS. 14-16 show specific blocks in particular orders, the operations of the exemplary methods can be performed in different orders than shown and can be combined and/or divided into blocks having different functionality than shown. Optional blocks or operations are indicated by dashed lines.

In particular, FIG. 14 shows a flow diagram of an exemplary method (e.g., procedure) for configuring quality of experience (QoE) measurements by user equipment (UEs), according to various exemplary embodiments of the present disclosure. The exemplary method can be performed by a first radio network node (RNN, e.g., base station, eNB, gNB, ng-eNB, etc., or components thereof) in a wireless network (e.g., E-UTRAN, NG-RAN).

The exemplary method can include the operations of block 1410, where the first RNN can receive, from a measurement function in the wireless network, a QoE measurement configuration (QMC) associated with one more service types. For example, the measurement function can be in a core network (e.g., EPC, 5GC) or part of an operations/administration/maintenance (OAM) function associated with the wireless network. The exemplary method can also include the operations of block 1420, where the first RNN can configure one or more UEs with the QMC. This can be done, for example, based on determining that the UE(s) meet the criteria included in the QMC, such as discussed above. The exemplary method can also include the operations of block 1420, where the first RNN can send, to a second RNN in the wireless network, a first request for handover of a particular one of the UEs from a first cell served by the first RNN via a first radio access technology (RAT) to a second cell served by the second RNN via a second RAT (i.e., different than the first RAT). The first request for handover includes the QMC.

In some embodiments, the QMC includes identifiers of one or more service types associated with the first RAT and an area scope field that includes one or more identifiers associated with the first RAT. In some embodiments, the QMC also includes identifiers of one or more service types associated with the second RAT, and the area scope field also includes one or more identifiers associated with the second RAT. In such embodiments, the identifiers associated with the first RAT and the identifiers associated with the second RAT can include one or more of the following: cell identifiers, tracking area codes (TACs), tracking area identities (TAIs), and public land mobile network identities (PLMN IDs). Table 1 above provides various examples of such identifiers.

In some embodiments, the exemplary method can also include the operations of block 1440, where the first RNN can, after sending the first request for handover, receive from the particular UE a measurement report for QoE measurements via the first RAT based on the QMC. The measurement report can include an indication that the measurement report is unsolicited or event-based (e.g., in relation to a handover). In some embodiments, the exemplary method can also include the operations of block 1450, where the first RNN can receive, from the second RNN, a second request for handover of the particular UE from the second cell to the first cell. The second request also includes the QMC for the UE.

In addition, FIG. 15 shows a flow diagram of another exemplary method (e.g., procedure) for configuring quality of experience (QoE) measurements by user equipment (UEs), according to various exemplary embodiments of the present disclosure. The exemplary method can be performed by a second radio network node (RNN, e.g., base station, eNB, gNB, ng-eNB, etc., or components thereof) in a wireless network (e.g., E-UTRAN, NG-RAN).

The exemplary method can include the operations of block 1510, where the second RNN can receive, from a first RNN in the wireless network, a first request for handover of a UE from a first cell served by the first RNN via a first RAT to a second cell served by the second RNN via a second RAT (i.e., different than the first RAT). The first request can include a QoE measurement configuration (QMC) for the UE. The exemplary method can also include the operations of block 1520, where the second RNN can determine whether the UE can perform QoE measurements via the second RAT in accordance with the QMC. The exemplary method can also include the operations of block 1530, where the second RNN can send, to the UE, an indication of whether the UE can perform QoE measurements via the second RAT in accordance with the QMC.

In some embodiments, the QMC includes identifiers of one or more service types associated with the first RAT and an area scope field that includes one or more identifiers associated with the first RAT. In some embodiments, the QMC also includes identifiers of one or more service types associated with the second RAT, and the area scope field (of the QMC) also includes one or more identifiers associated with the second RAT. In such embodiments, the identifiers associated with the first RAT and the identifiers associated with the second RAT can include one or more of the following: cell identifiers, tracking area codes (TACs), tracking area identities (TAIs), and public land mobile network identities (PLMN IDs). Table 1 above provides various examples of such identifiers.

In some embodiments, the determining operations of block 1520 can include one or more of the operations of sub-blocks 1521-1523. In sub-block 1521, the second RNN can determine whether the QMC includes one or more service types associated with the second RAT. In sub-block 1522, the second RNN can determine whether the QMC includes one or more service types associated with the first RAT that are also applicable (e.g., supported) in the second RAT. In sub-block 1523, the second RNN can determine whether the QMC includes one or more identifiers associated with the second RAT.

In various embodiments, affirmative determinations for one or more of sub-blocks 1521-1523 can result in a determination that the UE can perform QoE measurements via the second RAT in accordance with the QMC. Similarly, in various embodiments, whereas negative determinations for one or more of sub-blocks 1521-1523 can result in a determination that the UE cannot perform QoE measurements via the second RAT in accordance with the QMC.

In some embodiments, the indication of whether the UE can perform QoE measurements via the second RAT can include a plurality of indications corresponding to QoE measurements for a respective plurality of service types. For example, in such embodiments, the determining operations in block 1520 can be performed independently for each service type.

In some embodiments, the exemplary method can also include the operations of block 1540, where the second RNN can, after sending the UE an indication that the UE can perform QoE measurements via the second RAT in accordance with the QMC, receive from the UE a measurement report of QoE measurements based on the QMC. In some of these embodiments, the measurement report can include an indication of a mapping between a first access bearer used for the QoE measurements in the first RAT and a second access bearer used for the QoE measurements in the second RAT.

In some embodiments, the exemplary method can also include the operations of block 1550, where the second RNN can store the QMC based on determining (e.g., in block 1520) that the UE cannot perform QoE measurements via the second RAT in accordance with the QMC. In some of these embodiments, the exemplary method can also include the operations of blocks 1560-1580. In block 1560, the second RNN can determine that the UE should be handed over to a third cell served by a third RNN via the first RAT. The third RNN can be the first RNN, but this identity is not required. In blocks 1570, the second RNN can retrieve the stored QMC. In block 1580, the second RNN can send, to the third RNN, a second request for handover of the UE from the second cell to the third cell. The second handover request includes the QMC that was stored (e.g., in block 1550) and retrieved (e.g., in block 1570).

In addition, FIG. 16 shows a flow diagram of an exemplary method (e.g., procedure) for performing quality of experience (QoE) measurements configured by a wireless network, according to various exemplary embodiments of the present disclosure. The exemplary method can be performed by a user equipment (UE, e.g., wireless device, IoT device, modem, etc. or component thereof) in communication with first and second RNNs (e.g., base stations, eNBs, gNBs, ng-eNBs, etc., or components thereof) in the wireless network (e.g., E-UTRAN, NG-RAN).

The exemplary method can include operations of block 1610, where the UE can receive a QoE measurement configuration (QMC) associated with one or more service types from a first radio network node (RNN) serving the UE in a first cell of the wireless network via a first radio access technology (RAT). The exemplary method can also include operations of block 1630, where the UE can receive, from a second RNN serving a second cell in the wireless network via a second RAT (i.e., different than the first RAT), a first command for handover of the UE from the first cell to the second cell. The exemplary method can include operations of block 1650, where the UE can receive, from the second RNN, an indication of whether the UE can perform QoE measurements via the second RAT in accordance with the QMC.

In some embodiments, the indication received from the second RNN (e.g., in block 1650) can include a plurality of indications corresponding to QoE measurements for a respective plurality of service types.

In some embodiments, the QMC can include identifiers of one or more service types associated with the first RAT and an area scope field that includes one or more identifiers associated with the first RAT. In some embodiments, the QMC can also include identifiers of one or more service types associated with the second RAT, and the area scope field (in the QMC) can also include one or more identifiers associated with the second RAT. In such embodiments, the identifiers associated with the first RAT and the identifiers associated with the second RAT can include one or more of the following: cell identifiers, tracking area codes (TACs), tracking area identities (TAIs), and public land mobile network identities (PLMN IDs). Table 1 above provides various examples of such identifiers.

In some embodiments, the exemplary method can also include operations of block 1620, where the UE can, based on initiating an application session corresponding to one of the service types, perform QoE measurements in accordance with the QMC.

In some of these embodiments, the application session can be initiated in the first cell and the exemplary method can also include the operations of block 1640, where the UE can send, to the first RNN in response to the first command, a first measurement report for QoE measurements performed in the first cell via the first RAT. The measurement report can include an indication that the measurement report is unsolicited or event-based (e.g., due to handover). In some of these embodiments, the exemplary method can also include operations of block 1660, where the UE can selectively continue the QoE measurements in the second cell based on the indication (e.g., in block 1650) of whether the UE can perform QoE measurements via the second RAT in accordance with the QMC.

In other of these embodiments, the application session can be initiated in the second cell and the exemplary method can also include the operations of block 1670, where the UE can selectively initiate the QoE measurements in the second cell based on the indication (e.g., in block 1650) of whether the UE can perform QoE measurements via the second RAT in accordance with the QMC.

In various embodiments, the exemplary method can also include the operations of block 1680, where the UE can send, to the second RNN, a second measurement report for QoE measurements performed in the second cell via the second RAT. This can be sent if the UE initiated (e.g., in block 1670) or continued (e.g., in block 1660) the QoE measurements in the second cell. In some embodiments, if the UE continued the QoE measurements in the second cell, the second measurement report can include an indication of a mapping between a first access bearer used for the QoE measurements in the first RAT and a second access bearer used for the QoE measurements in the second RAT.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 17:
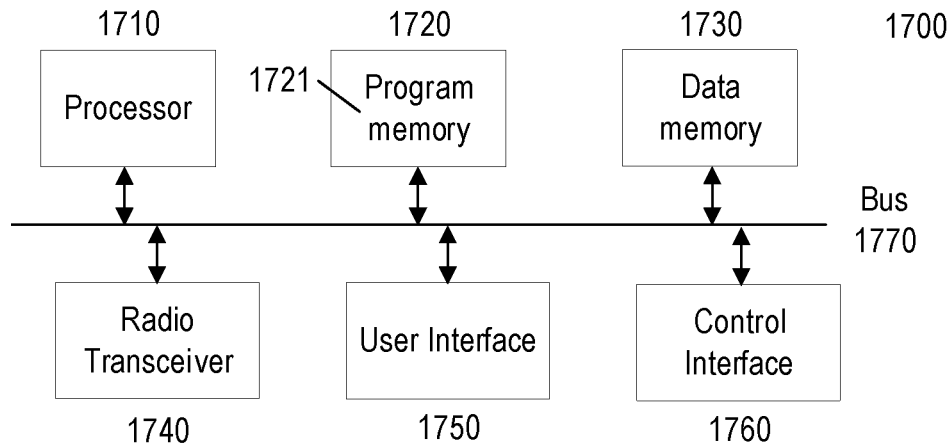
FIG. 17 illustrates a block diagram of an exemplary wireless device or UE, according to various exemplary embodiments of the present disclosure.

FIG. 17 shows a block diagram of an exemplary wireless device or user equipment (UE) configurable according to various exemplary embodiments of the present disclosure, including by execution of instructions on a computer-readable medium that correspond to, or comprise, any of the exemplary methods and/or procedures described above. For simplicity, the exemplary wireless device or UE will be referred to as "device 1700" in the following description.

Exemplary device 1700 can comprise a processor 1710 that can be operably connected to a program memory 1720 and/or a data memory 1730 via a bus 1770 that can comprise parallel address and data buses, serial ports, or other methods and/or structures known to those of ordinary skill in the art. Program memory 1720 can store software code, programs, and/or instructions (collectively shown as computer program product 1721 in FIG. 17) executed by processor 1710 that can configure and/or facilitate device 1700 to perform various operations, including operations described below. For example, execution of such instructions can configure and/or facilitate exemplary device 1700 to communicate using one or more wired or wireless communication protocols, including one or more wireless communication protocols standardized by 3GPP, 3GPP2, or IEEE, such as those commonly known as 5G/NR, NR-U, LTE, LTE-A, LTE LAA/eLAA/feLAA, UMTS, HSPA, GSM, GPRS, EDGE, 1xRTT, CDMA2000, 802.11 WiFi, HDMI, USB, Firewire, etc., or any other current or future protocols that can be utilized in conjunction with radio transceiver 1740, user interface 1750, and/or host interface 1760.

As another example, processor 1710 can execute program code stored in program memory 1720 that corresponds to MAC, RLC, PDCP, and RRC layer protocols standardized by 3GPP (e.g., for NR and/or LTE). As a further example, processor 1710 can execute program code stored in program memory 1720 that, together with radio transceiver 1740, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1720 can also comprises software code executed by processor 1710 to control the functions of device 1700, including configuring and controlling various components such as radio transceiver 1740, user interface 1750, and/or host interface 1760. Program memory 1720 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1720 can comprise an external storage arrangement (not shown) remote from device 1700, from which the instructions can be downloaded into program memory 1720 located within or removably coupled to device 1700, so as to enable execution of such instructions.

Data memory 1730 can comprise memory area for processor 1710 to store variables used in protocols, configuration, control, and other functions of device 1700, including operations corresponding to, or comprising, any of the exemplary methods and/or procedures described herein. Moreover, program memory 1720 and/or data memory 1730 can comprise non-volatile memory (e.g., flash memory), volatile memory (e.g., static or dynamic RAM), or a combination thereof. Furthermore, data memory 1730 can comprise a memory slot by which removable memory cards in one or more formats (e.g., SD Card, Memory Stick, Compact Flash, etc.) can be inserted and removed. Persons of ordinary skill in the art will recognize that processor 1710 can comprise multiple individual processors (including, e.g., multi-core processors), each of which implements a portion of the functionality described above. In such cases, multiple individual processors can be commonly connected to program memory 1720 and data memory 1730 or individually connected to multiple individual program memories and or data memories. More generally, persons of ordinary skill in the art will recognize that various protocols and other functions of device 1700 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A radio transceiver 1740 can comprise radio-frequency transmitter and/or receiver circuitry that facilitates the device 1700 to communicate with other equipment supporting like wireless communication standards and/or protocols. In some exemplary embodiments, the radio transceiver 1740 includes a transmitter and a receiver that enable device 1700 to communicate with various 5G/NR networks according to various protocols and/or methods proposed for standardization by 3GPP and/or other standards bodies. For example, such functionality can operate cooperatively with processor 1710 to implement a PHY layer based on OFDM, OFDMA, and/or SC-FDMA technologies, such as described herein with respect to other figures.

In some exemplary embodiments, radio transceiver 1740 includes an LTE transmitter and receiver that can facilitate device 1700 to communicate with various LTE, LTE-Advanced (LTE-A), and/or NR networks according to standards promulgated by 3GPP. In some exemplary embodiments, radio transceiver 1740 includes circuitry, firmware, etc. necessary for the device 1700 to communicate with various 5G/NR, LTE, LTE-A, UMTS, and/or GSM/EDGE networks, also according to 3GPP standards. In some exemplary embodiments of the present disclosure, radio transceiver 1740 includes circuitry, firmware, etc. necessary for the device 1700 to communicate with various CDMA2000 networks, according to 3GPP2 standards.

In some exemplary embodiments of the present disclosure, the radio transceiver 1740 is capable of communicating using radio technologies that operate in unlicensed frequency bands, such as IEEE 802.11 WiFi that operates using frequencies in the regions of 2.4, 5.6, and/or 60 GHz. In some exemplary embodiments, radio transceiver 1740 can include circuitry, firmware, etc. necessary for the device 1700 to communicate using cellular protocols in unlicensed or shared spectrum, e.g., via NR-U, LTE LAA/eLAA/feLAA, MulteFire, etc.

In some exemplary embodiments of the present disclosure, radio transceiver 1740 can comprise a transceiver that is capable of wired communication, such as by using IEEE 802.3 Ethernet technology.

The functionality of radio transceiver 1740 specific to each of these embodiments can be coupled with and/or controlled by other circuitry in the device 1700, such as the processor 1710 executing program code stored in program memory 1720 in conjunction with, or supported by, data memory 1730.

User interface 1750 can take various forms depending on the particular embodiment of device 1700, or can be absent from device 1700 entirely. In some exemplary embodiments, user interface 1750 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the device 1700 can comprise a tablet computing device including a larger touchscreen display. In such embodiments, one or more of the mechanical features of the user interface 1750 can be replaced by comparable or functionally equivalent virtual user interface features (e.g., virtual keypad, virtual buttons, etc.) implemented using the touchscreen display, as familiar to persons of ordinary skill in the art. In other embodiments, the device 1700 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1700 having a touch screen display are capable of receiving user inputs, such as inputs related to exemplary methods and/or procedures described herein or otherwise known to persons of ordinary skill in the art.

In some exemplary embodiments of the present disclosure, device 1700 can comprise an orientation sensor, which can be used in various ways by features and functions of device 1700. For example, the device 1700 can use outputs of the orientation sensor to determine when a user has changed the physical orientation of the device 1700's touch screen display. An indication signal from the orientation sensor can be available to any application program executing on the device 1700, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1760 of the device 1700 can take various forms depending on the particular exemplary embodiment of device 1700 and of the particular interface requirements of other devices that the device 1700 is intended to communicate with and/or control. For example, the control interface 1760 can comprise an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1760 can comprise an IEEE 802.3 Ethernet interface such as described above. In some exemplary embodiments of the present disclosure, the control interface 1760 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1700 can comprise more functionality than is shown in FIG. 17 including, for example, a video and/or still-image camera, microphone, media player and/or recorder, etc. Moreover, radio transceiver 1740 can include circuitry necessary to communicate using additional radio-frequency communication standards including Bluetooth, GPS, and/or others. Moreover, the processor 1710 can execute software code stored in the program memory 1720 to control such additional functionality. For example, directional velocity and/or position estimates output from a GPS receiver can be available to any application program executing on the device 1700, including various exemplary methods and/or computer-readable media according to various exemplary embodiments of the present disclosure.

Figure 18:
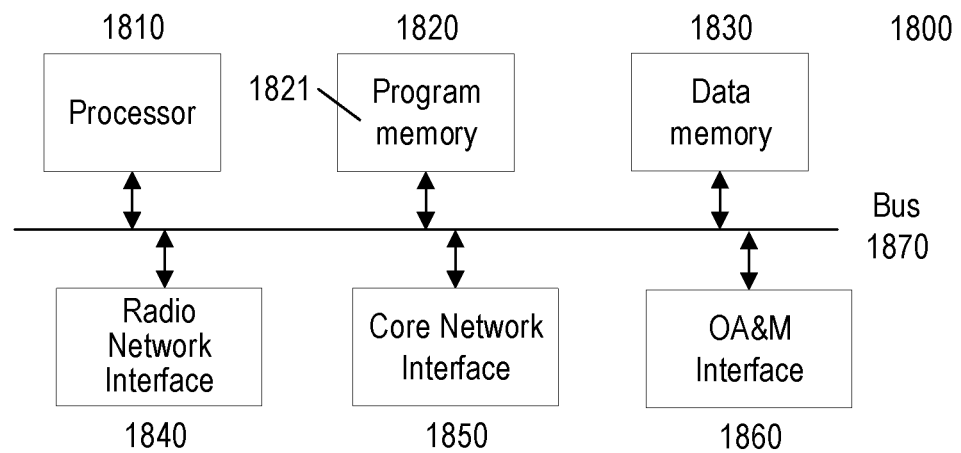
FIG. 18 illustrates a block diagram of an exemplary network node in a radio access network (e.g., gNB in an NG-RAN).

FIG. 18 shows a block diagram of an exemplary network node 1800 configurable according to various embodiments of the present disclosure, including those described above with reference to other figures. In some exemplary embodiments, network node 1800 can comprise a base station, eNB, gNB, or component thereof. Network node 1800 includes processor 1810 that is operably connected to program memory 1820 and data memory 1830 via bus 1870, which can comprise parallel address and data buses, serial ports, or other methods and/or structures known to those of ordinary skill in the art.

Program memory 1820 can store software code, programs, and/or instructions (collectively shown as computer program product 1821 in FIG. 18) executed by processor 1810 that can configure and/or facilitate network node 1800 to perform various operations, including operations described below. For example, execution of such stored instructions can configure network node 1800 to communicate with one or more other devices using protocols according to various embodiments of the present disclosure, including one or more exemplary methods and/or procedures discussed above. Furthermore, execution of such stored instructions can also configure and/or facilitate network node 1800 to communicate with one or more other devices using other protocols or protocol layers, such as one or more of the PHY, MAC, RLC, PDCP, and RRC layer protocols standardized by 3GPP for NR, NR-U, LTE, LTE-A, LTE LAA/eLAA/feLAA, or any other higher-layer protocols utilized in conjunction with radio network interface 1840 and core network interface 1850. By way of example and without limitation, core network interface 1850 can comprise the S1 interface and radio network interface 1850 can comprise the Uu interface, as standardized by 3GPP. Program memory 1820 can also include software code executed by processor 1810 to control the functions of network node 1800, including configuring and controlling various components such as radio network interface 1840 and core network interface 1850.

Data memory 1830 can comprise memory area for processor 1810 to store variables used in protocols, configuration, control, and other functions of network node 1800. As such, program memory 1820 and data memory 1830 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1810 can comprise multiple individual processors (not shown), each of which implements a portion of the functionality described above. In such case, multiple individual processors may be commonly connected to program memory 1820 and data memory 1830 or individually connected to multiple individual program memories and/or data memories. More generally, persons of ordinary skill in the art will recognize that various protocols and other functions of network node 1800 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1840 can comprise transmitters, receivers, signal processors, ASICs, antennas, beamforming units, and other circuitry that enables network node 1800 to communicate with other equipment such as, in some embodiments, a plurality of compatible user equipment (UE). In some exemplary embodiments, radio network interface 1840 can comprise various protocols or protocol layers, such as the PHY, MAC, RLC, PDCP, and RRC layer protocols standardized by 3GPP for NR, NR-U, LTE, LTE-A, and/or LTE LAA/eLAA/feLAA; improvements thereto such as described herein above; or any other higher-layer protocols utilized in conjunction with radio network interface 1840. According to further exemplary embodiments, the radio network interface 1840 can comprise a PHY layer based on OFDM, OFDMA, and/or SC-FDMA technologies. In some embodiments, the functionality of such a PHY layer can be provided cooperatively by radio network interface 1840 and processor 1810, possibly in conjunction with program code or computer program product 1821 in memory 1820.

Core network interface 1850 can comprise transmitters, receivers, and other circuitry that enables network node 1800 to communicate with other equipment in a core network such as, in some embodiments, circuit-switched (CS) and/or packet-switched Core (PS) networks. In some embodiments, core network interface 1850 can comprise the S1 interface standardized by 3GPP. In some exemplary embodiments, core network interface 1850 can comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1850 can comprise one or more of asynchronous transfer mode (ATM), Internet Protocol (IP)-over-Ethernet, SDH over optical fiber, T1/E1/PDH over a copper wire, microwave radio, integrated access backhaul (IAB), or other wired or wireless transmission technologies known to those of ordinary skill in the art.

OA&M interface 1860 can comprise transmitters, receivers, and other circuitry that enables network node 1800 to communicate with external networks, computers, databases, and the like for purposes of operations, administration, and maintenance of network node 1800 or other network equipment operably connected thereto. Lower layers of OA&M interface 1860 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1840, core network interface 1850, and OA&M interface 1860 may be multiplexed together on a single physical interface, such as the examples listed above.

Figure 19:
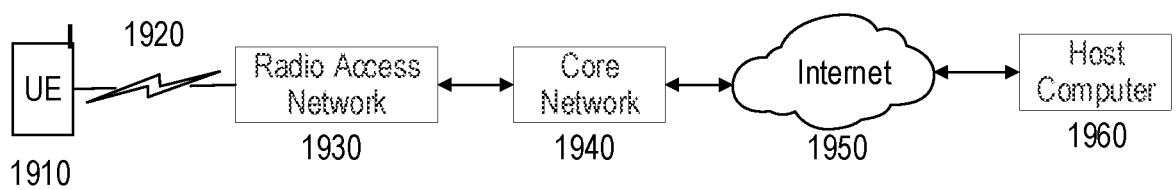
FIG. 19 illustrates a block diagram of an exemplary network configuration usable to provide over-the-top (OTT) data services between a host computer and a UE, according to various exemplary embodiments of the present disclosure.

FIG. 19 is a block diagram of an exemplary communication network configured to provide over-the-top (OTT) data services between a host computer and a user equipment (UE), according to one or more exemplary embodiments of the present disclosure. UE 1910 can communicate with radio access network (RAN) 1930 over radio interface 1920, which can be based on protocols described above including, e.g., LTE, LTE-A, and 5G/NR. For example, UE 1910 can be configured and/or arranged as shown in other figures discussed above. RAN 1930 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1930 can cooperatively operate using licensed and unlicensed spectrum.

RAN 1930 can further communicate with core network 1940 according to various protocols and interfaces described above. For example, one or more apparatus (e.g., base stations, eNBs, gNBs, etc.) comprising RAN 1930 can communicate to core network 1940 via core network interface 1950 described above. In some exemplary embodiments, RAN 1930 and core network 1940 can be configured and/or arranged as shown in other figures discussed above. For example, eNBs comprising an E-UTRAN 1930 can communicate with an EPC core network 1940 via an S1 interface, such as illustrated in FIG. 1. As another example, gNBs comprising a NR RAN 1930 can communicate with a 5GC core network 1930 via an NG interface, such as illustrated in FIGS. 3-4.

Core network 1940 can further communicate with an external packet data network, illustrated in FIG. 19 as Internet 1950, according to various protocols and interfaces known to persons of ordinary skill in the art. Many other devices and/or networks can also connect to and communicate via Internet 1950, such as exemplary host computer 1960. In some exemplary embodiments, host computer 1960 can communicate with UE 1910 using Internet 1950, core network 1940, and RAN 1930 as intermediaries. Host computer 1960 can be a server (e.g., an application server) under ownership and/or control of a service provider. Host computer 1960 can be operated by the OTT service provider or by another entity on the service provider's behalf.

For example, host computer 1960 can provide an over-the-top (OTT) packet data service to UE 1910 using facilities of core network 1940 and RAN 1930, which can be unaware of the routing of an outgoing/incoming communication to/from host computer 1960. Similarly, host computer 1960 can be unaware of routing of a transmission from the host computer to the UE, e.g., the routing of the transmission through RAN 1930. Various OTT services can be provided using the exemplary configuration shown in FIG. 19 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 19 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OT service provider, measurements can be facilitated by proprietary signaling between the UE and the host computer.

Exemplary embodiments described herein provide efficient techniques for application-layer QoE measurements by a UE—such as UE 1910—particularly in relation to scenarios involving inter-RAT handover. For example, the UE can be configured to continue performing such QoE measurements across inter-RAT handovers, or to pause such measurements until returning to the RAT in which they were initiated. Advantages include larger QoE measurement sets that facilitate better network planning and management for provisioning of OTT services that meet end-user experience requirements. Furthermore, by continuing measurements across different RATs, the resulting measurements can provide valuable insight into how the type of RAT impacts the user experience in the application layer When used in NR UEs (e.g., UE 1910) and gNBs (e.g., gNBs comprising RAN 1930), exemplary embodiments described herein can provide various improvements, benefits, and/or advantages to end-user experience of OTT services, which can increase the use of such services to the benefit of both OTT service provides and end users.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The techniques and apparatus described herein include, but are not limited to, the following enumerated examples:

A1. A method, for a first radio network node (RNN) in a wireless network, for configuring quality of experience (QoE) measurements by user equipment (UEs), the method comprising:
    receiving, from a measurement function in the wireless network, a QoE measurement configuration (QMC) associated with one more service types;
    configuring one or more UEs with the QMC; and
    sending, to a second RNN in the wireless network, a first handover request for a particular one of the UEs, wherein:
        the first handover request includes the QMC,
        the first RNN utilizes a first radio access technology (RAT) to serve the UEs in a first cell, and
        the second RNN utilizes a second RAT to serve UEs in a second cell.

A2. The method of embodiment A1, wherein:
    the QMC includes identifiers of one or more service types associated with the first RAT.
    the QMC also includes an area scope field; and
    the area scope field includes one or more identifiers associated with the first RAT.

A3. The method of embodiment A2, wherein:
    the QMC also includes identifiers of one or more service types associated with the second RAT; and
    the area scope field also includes one or more identifiers associated with the second RAT.

A4. The method of embodiment A3, wherein the identifiers associated with the first RAT and the identifiers associated with the second RAT are any of the following: cell identifiers, tracking area codes (TACs), or tracking area identities (TAIs).

A5. The method of any of embodiments A1-A4, wherein:
    the method further comprises, after sending the first handover request, receiving, from the UE, a measurement report for QoE measurements via the first RAT based on the QMC; and
    the measurement report includes an indication that the measurement report is unsolicited or event-based.

A6. The method of any of embodiments A1-A5, further comprising receiving, from the second RNN, a second handover request for the UE from the second cell to the first cell, wherein the second handover request includes the QMC.

B1. A method, for a second radio network node (RNN) in a wireless network, for configuring quality of experience (QoE) measurements by user equipment (UEs), the method comprising:
  receiving, from a first RNN in the wireless network, a first handover request for a user equipment (UE) from a first cell served by the first RNN via a first radio access technology (RAT), to a second cell served by the second RNN via a second RAT, wherein:
    the first handover request includes a QoE measurement configuration (QMC) associated with one or more service types, for which the UE was configured to perform via the first RAT;
  determining whether the UE can perform QoE measurements via the second RAT in accordance with the QMC;
  sending, to the UE, an indication of whether the UE can perform QoE measurements via the second RAT in accordance with the QMC.

B2. The method of embodiment B1, wherein:
  the QMC includes identifiers of one or more service types associated with the first RAT.
  the QMC also includes an area scope field; and
  the area scope field includes one or more identifiers associated with the first RAT.

B3. The method of embodiment B2, wherein:
  the QMC also includes identifiers of one or more service types associated with the second RAT; and
  the area scope field also includes one or more identifiers associated with the second RAT.

B4. The method of embodiment B3, wherein the identifiers associated with the first RAT and the identifiers associated with the second RAT are any of the following: cell identifiers, tracking area codes (TACs), or tracking area identities (TAIs).

B5. The method of any of embodiments B1-B4, wherein determining whether the UE can perform QoE measurements via the second RAT in accordance with the QMC includes one or more of the following operations:
  determining whether the QMC includes one or more service types associated with the second RAT;
  determining whether the QMC includes one or more service types associated with the first RAT that are also applicable in the second RAT; and
  determining whether the QMC includes one or more identifiers associated with the second RAT.

B6. The method of embodiment B5, wherein the indication of whether the UE can perform QoE measurements via the second RAT includes a plurality of indications, each corresponding to a particular one of the service types.

B7. The method of any of embodiments B1-B6, further comprising, based on determining that the UE cannot perform QoE measurements via the second RAT in accordance with the QMC, storing the QMC.

B8. The method of embodiment B7, further comprising:
  determining that the UE should be handed over to a third cell served by a third RNN via the first RAT;
  retrieving the stored QMC for the UE; and
  sending, to the third RNN, a second handover request for the UE from the second cell to the third cell, wherein the second handover request includes the QMC.

B9. The method of any of embodiments B1-B6, further comprising, after sending the UE an indication that the UE can perform QoE measurements via the second RAT in accordance with the QMC, receiving, from the UE, a measurement report for QoE measurements based on the QMC.

B10. The method of embodiment B9, wherein the measurement report includes an indication of a mapping between a first access bearer used for the QoE measurements in the first RAT and a second access bearer used for the QoE measurements in the second RAT.

C1. A method, for a user equipment (UE), for performing quality of experience (QoE) measurements configured by a wireless network, the method comprising:
  receiving, from a first radio network node (RNN) serving a first cell in the wireless network, a QoE measurement configuration (QMC) associated with one or more service types, wherein the UE is served in the first cell via a first radio access technology (RAT);
  receiving, from a second RNN in the wireless network, a first command for handover of the UE from the first cell to a second cell served by the second RNN via a second RAT; and
  receiving, from the second RNN, an indication of whether the UE can perform QoE measurements via the second RAT in accordance with the QMC.

C2. The method of embodiment C1, wherein:
  the QMC includes identifiers of one or more service types associated with the first RAT.
  the QMC also includes an area scope field; and
  the area scope field includes one or more identifiers associated with the first RAT.

C3. The method of embodiment C2, wherein:
  the QMC also includes identifiers of one or more service types associated with the second RAT; and
  the area scope field also includes one or more identifiers associated with the second RAT.

C4. The method of embodiment C3, wherein the identifiers associated with the first RAT and the identifiers associated with the second RAT are any of the following: cell identifiers, tracking area codes (TACs), or tracking area identities (TAIs).

C5. The method of any of embodiments C1-C4, further comprising, based on initiating an application session corresponding to one of the service types, performing QoE measurements in accordance with the QMC.

C6. The method of embodiment C5, wherein:
  the application session is initiated in the first cell;
  the method further comprises, sending, to the first RNN in response to the first handover command, a first measurement report for QoE measurements performed in the first cell via the first RAT; and
  the measurement report includes an indication that the measurement report is unsolicited or event-based.

C7. The method of embodiment C6, further comprising selectively continuing the QoE measurements in the second cell via the second RAT based on the indication.

C8. The method of embodiment C5, wherein:
  the application session is initiated in the second cell;
  the method further comprises selectively initiating the QoE measurements in the second cell via the second RAT based on the indication.

C9. The method of any of embodiments C6-C8, further comprising, sending, to the second RNN, a second measurement report for QoE measurements performed in the second cell via the second RAT.

C10. The method of embodiment C9, wherein the second measurement report includes an indication of a mapping between a first access bearer used for the QoE measurements in the first RAT and a second access bearer used for the QoE measurements in the second RAT.

C11. The method of embodiment B5, wherein the indication of whether the UE can perform QoE measurements via the second RAT includes a plurality of indications, each corresponding to a particular one of the service types.

D1. A radio network node (RNN) arranged to configure quality of experience (QoE) measurements by user equipment (UEs) in a wireless network, the RNN comprising:
   radio network interface circuitry configured to communicate with one or more UEs and with one or more further RNNs; and
   processing circuitry operatively coupled to the radio network interface circuitry, whereby the processing circuitry and the radio network interface circuitry are configured to perform operations corresponding to any of the methods of embodiments A1-A6 and B1-B10.

D2. A radio network node (RNN) arranged to configure quality of experience (QoE) measurements by user equipment (UEs) in a wireless network, the RNN being further arranged to perform operations corresponding to any of the methods of embodiments A1-A6 and B1-B10.

D3. A non-transitory, computer-readable medium storing computer-executable instructions that, when executed by processing circuitry of a radio network node (RNN) arranged to configure quality of experience (QoE) measurements by user equipment (UEs) in a wireless network, configure the RNN to perform operations corresponding to any of the methods of embodiments A1-A6 and B1-B10.

D4. A computer program product comprising computer-executable instructions that, when executed by processing circuitry of a radio network node (RNN) arranged to configure quality of experience (QoE) measurements by user equipment (UEs) in a wireless network, configure the RNN to perform operations corresponding to any of the methods of embodiments A1-A6 and B1-B10.

E1. A user equipment (UE) arranged to perform quality of experience (QoE) measurements configured by a wireless network, the UE comprising:
   radio transceiver circuitry configured to communicate with a plurality of radio network nodes (RNNs) in the wireless network; and
   processing circuitry operatively coupled to the radio transceiver circuitry, whereby the processing circuitry and the radio transceiver circuitry are configured to perform operations corresponding to any of the methods of examples C1-C11.

E2. A user equipment (UE) arranged to perform quality of experience (QoE) measurements configured by a wireless network, the UE being further arranged to perform operations corresponding to any of the methods of embodiments C1-C11.

E3. A non-transitory, computer-readable medium storing computer-executable instructions that, when executed by processing circuitry of a user equipment (UE) arranged to perform quality of experience (QoE) measurements configured by a wireless network, configure the UE to perform operations corresponding to any of the methods of embodiments C1-C11.

E4. A computer program product comprising computer-executable instructions that, when executed by processing circuitry of a user equipment (UE) arranged to perform quality of experience (QoE) measurements configured by a wireless network, configure the UE to perform operations corresponding to any of the methods of embodiments C1-C11.

The invention claimed is:

1. A method for a first radio network node (RNN) in a wireless network to configure quality of experience (QoE) measurements by user equipment (UEs), the method comprising:
   receiving, from a measurement function in the wireless network, a QoE measurement configuration associated with one or more service types;
   configuring one or more UEs with the QoE measurement configuration;
   sending, to a second RNN in the wireless network, a first request for handover of a particular one of the UEs from a first cell served by the first RNN via a first radio access technology (RAT) to a second cell served by the second RNN via a second RAT, the first request including the QoE measurement configuration;
   the QoE measurement configuration including an area scope field and identifiers of one or more service types associated with the second RAT; and
   the area scope field including one or more identifiers associated with the second RAT.

2. The method of claim 1, wherein:
   the QoE measurement configuration includes identifiers of one or more service types associated with the first RAT; and
   the area scope field includes one or more identifiers associated with the first RAT.

3. A method for a second radio network node (RNN) in a wireless network to configure quality of experience (QoE) measurements by user equipment (UEs), the method comprising:
   receiving, from a first RNN in the wireless network, a first request for handover of a UE from a first cell served by the first RNN via a first radio access technology (RAT) to a second cell served by the second RNN via a second RAT, the first request the first request including a QoE measurement configuration, QMC, for the UE;
   the QoE measurement configuration including an area scope field and identifiers of one or more service types associated with the second RAT;
   the area scope field including one or more identifiers associated with the second RAT;
   determining whether the UE can perform QoE measurements via the second RAT in accordance with the QoE measurement configuration; and
   sending, to the UE, an indication of whether the UE can perform QoE measurements via the second RAT in accordance with the QoE measurement configuration.

4. The method of claim 3, wherein:
   the QoE measurement configuration includes identifiers of one or more service types associated with the first RAT; and
   the area scope field includes one or more identifiers associated with the first RAT.

5. A method for a user equipment (UE) to perform quality of experience (QoE) measurements configured by a wireless network, the method comprising:
   receiving a QoE measurement configuration associated with one or more service types from a first radio network node (RNN) serving the UE in a first cell of the wireless network via a first radio access technology (RAT);
   the QoE measurement configuration including an area scope field and identifiers of one or more service types associated with the second RAT;
   the area scope field including one or more identifiers associated with the second RAT;
   receiving, from a second RNN serving a second cell in the wireless network via a second RAT, a first command for handover of the UE from the first cell to the second cell; and receiving, from the second RNN, an indication of whether the UE can perform QoE measurements via the second RAT in accordance with the QoE measurement configuration.

6. The method of claim 5, wherein:
the QoE measurement configuration includes an area scope field and identifiers of one or more service types associated with the first RAT; and
the area scope field includes one or more identifiers associated with the first RAT.

7. The method of claim 5, wherein the identifiers associated with the first RAT and the identifiers associated with the second RAT include one or more of the following: cell identifiers, tracking area codes (TACs); tracking area identities (TAIs); and public land mobile network identities (PLMN IDs).

8. The method of claim 5, further comprising, based on initiating an application session corresponding to one of the service types, performing QoE measurements in accordance with the QoE measurement configuration.

9. The method of claim 8, wherein:
the application session is initiated in the first cell;
the method further comprises sending, to the first RNN in response to the first command, a first measurement report for QoE measurements performed in the first cell via the first RAT; and
the measurement report includes an indication that the measurement report is unsolicited or event-based.

10. The method of claim 9, further comprising selectively continuing the QoE measurements in the second cell based on the indication of whether the UE can perform QoE measurements via the second RAT in accordance with the QoE measurement configuration.

11. A first radio network node (RNN) arranged to configure quality of experience (QoE) measurements by user equipment (UEs) in a wireless network, the first RNN comprising:
radio network interface circuitry configured to communicate with one or more UEs and with at least a second RNN in the wireless network; and
processing circuitry operatively coupled to the radio network interface circuitry, whereby the processing circuitry and the radio network interface circuitry are configured to perform operations corresponding to the method of claim 1.

12. A non-transitory, computer-readable medium storing computer-executable instructions that, when executed by processing circuitry of a first radio network node (RNN) arranged to configure quality of experience (QoE) measurements by user equipment (UEs) in a wireless network, configure the first RNN to perform operations corresponding to the method of claim 1.

13. A second radio network node (RNN) arranged to configure quality of experience (QoE) measurements by user equipment (UEs) in a wireless network, the second RNN comprising:
radio network interface circuitry configured to communicate with one or more UEs and with at least a first RNN in the wireless network; and
processing circuitry operatively coupled to the radio network interface circuitry, whereby the processing circuitry and the radio network interface circuitry are configured to perform operations corresponding to the method of claim 3.

14. A non-transitory, computer-readable medium storing computer-executable instructions that, when executed by processing circuitry of a second radio network node (RNN) arranged to configure quality of experience (QoE) measurements by user equipment (UEs) in a wireless network, configure the second RNN to perform operations corresponding to the method of claim 3.

15. A user equipment (UE) arranged to perform quality of experience (QoE) measurements configured by a wireless network, the UE comprising:
radio transceiver circuitry configured to communicate with at least first and second radio network nodes (RNNs) in the wireless network; and
processing circuitry operatively coupled to the radio transceiver circuitry, whereby the processing circuitry and the radio transceiver circuitry are configured to perform operations corresponding to the method of claim 5.

16. A non-transitory, computer-readable medium storing computer-executable instructions that, when executed by processing circuitry of user equipment (UE) arranged to perform quality of experience (QoE) measurements configured by a wireless network, configure the UE to perform operations corresponding to the method of claim 5.

* * * * *